US011483068B2

(12) United States Patent
Nakano

(10) Patent No.: US 11,483,068 B2
(45) Date of Patent: Oct. 25, 2022

(54) OPTICAL TRANSMISSION LINE MONITORING APPARATUS, OPTICAL TRANSMISSION LINE MONITORING SYSTEM, AND OPTICAL TRANSMISSION LINE MONITORING METHOD

(71) Applicant: NEC Corporation, Tokyo (JP)

(72) Inventor: Takehiro Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/294,178

(22) PCT Filed: Nov. 12, 2019

(86) PCT No.: PCT/JP2019/044430
§ 371 (c)(1),
(2) Date: May 14, 2021

(87) PCT Pub. No.: WO2020/100921
PCT Pub. Date: May 22, 2020

(65) Prior Publication Data
US 2022/0006524 A1  Jan. 6, 2022

(30) Foreign Application Priority Data
Nov. 16, 2018  (JP) .............................. JP2018-215319

(51) Int. Cl.
*H04B 10/071* (2013.01)
*H04B 10/079* (2013.01)
(52) U.S. Cl.
CPC .................. *H04B 10/0795* (2013.01)
(58) Field of Classification Search
CPC ........................ H04B 10/071; H04B 10/0795
See application file for complete search history.

(56) References Cited

U.S. PATENT DOCUMENTS 6,002,820 A    12/1999  Nitta
2005/0196167 A1  9/2005  Nagel
(Continued)

FOREIGN PATENT DOCUMENTS

JP    1992-240537    *  8/1992
JP    H04-240537 A      8/1992
(Continued)

OTHER PUBLICATIONS

Extended European Search Report for EP Application No. EP19885007.5 dated on Dec. 6, 2021.
(Continued)

*Primary Examiner* — Shi K Li

(57) ABSTRACT

Provided are an optical transmission line monitoring apparatus, an optical transmission line monitoring system, and an optical transmission line monitoring method capable of monitoring a plurality of optical transmission lines in parallel. A monitoring light output unit outputs monitoring lights with different frequencies to optical transmission lines. A local oscillation light source outputs a local oscillation light. An interference unit, to which return lights corresponding to the monitoring lights are input, configured to output an output light generated by interference between input lights and the local oscillation light. A conversion unit converts the output light into an electrical signal. A signal processing unit extracts, from the electrical signal, an intermediate-frequency signal based on each of the monitoring lights, and generates monitoring results of the optical transmission lines from the intermediate-frequency signal.

20 Claims, 26 Drawing Sheets

(56) References Cited

U.S. PATENT DOCUMENTS

| | | | |
|---|---|---|---|
| 2005/0196174 A1* | 9/2005 | Evangelides, Jr. | ............................ H04B 10/0771 398/151 |
| 2011/0194853 A1 | 8/2011 | Liu et al. | |
| 2013/0259469 A1 | 10/2013 | Smith et al. | |
| 2016/0277101 A1* | 9/2016 | Jiang | ....................... G01M 11/00 |
| 2017/0205255 A1* | 7/2017 | Nannipieri | ......... H04B 10/0731 |
| 2017/0248760 A1* | 8/2017 | Hu | ..................... G02B 6/12007 |

FOREIGN PATENT DOCUMENTS

| | | |
|---|---|---|
| JP | H11-055184 A | 2/1999 |
| JP | 2007-518365 A | 7/2007 |
| JP | 2012-506651 A | 3/2012 |
| JP | 2017-524955 A | 8/2017 |

OTHER PUBLICATIONS

International Search Report for PCT Application No. PCT/JP2019/044430, dated Jan. 21, 2020.

* cited by examiner

| USER | CONTROL SIGNAL | SYSTEM | MONITORING LIGHT |
|------|----------------|--------|------------------|
| U1 | C1 | S1 | M1 |
| U2 | C2, C3 | S2, S3 | M2, M3 |

Fig. 16

OPTICAL TRANSMISSION LINE MONITORING APPARATUS, OPTICAL TRANSMISSION LINE MONITORING SYSTEM, AND OPTICAL TRANSMISSION LINE MONITORING METHOD

This application is a National Stage Entry of PCT/JP2019/044430 filed on Nov. 12, 2019, which claims priority from Japanese Patent Application 2018-215319 filed on Nov. 16, 2018, the contents of all of which are incorporated herein by reference, in their entirety.

TECHNICAL FIELD

The present invention relates to an optical transmission line monitoring apparatus, an optical transmission line monitoring system, and an optical transmission line monitoring method.

BACKGROUND ART

In an optical network system connected by optical transmission lines, a failure such as a break of an optical transmission line can occur, and in order to detect such a failure, an optical transmission line monitoring apparatus such as a COTDR (Coherent Optical Time Domain Reflectometry) apparatus is used. Generally, such an optical transmission line monitoring apparatus outputs an optical pulse (monitoring light) to an optical transmission line, and obtains a relationship between a received power level and a distance as a cable loss trace from the received time of a return light generated by scattering of the monitoring light.

For example, a COTDR apparatus to be used in a submarine cable system has been proposed (Patent Literature 1). According to this COTDR apparatus, uplink and downlink optical transmission lines are laid under the sea, and the apparatus outputs a monitoring light to the uplink optical transmission line, receives, by coherent detection, the monitoring light that returns through the downlink optical transmission line, and thereby acquires a measurement result of the optical transmission line.

Further, COTDR measurement capable of improving the monitoring performance is proposed (Patent Literature 2). This technique outputs a plurality of monitoring lights with different frequencies to one optical transmission line and receives their return lights by coherent detection, which enables reduction of the detection time.

CITATION LIST

Patent Literature

PTL1: Published Japanese Translation of PCT International Publication for Patent Application, No. 2007-518365
PTL2: Published Japanese Translation of PCT International Publication for Patent Application, No. 2012-506651

SUMMARY OF INVENTION

Technical Problem

Since a plurality of optical transmission lines (systems) consisting of optical fibers are placed in a submarine cable, it is required to establish a technique for monitoring a plurality of optical transmission lines. Further, since there can be cases where a plurality of optical transmission lines are managed by different operators or where a plurality of optical transmission lines are managed by one operator but are managed separately in order to use different optical transmission lines depending on purposes, there are needs to monitor a plurality of optical transmission lines independently of one another. It is therefore desirable to monitor respective optical transmission lines in parallel. However, the above-described COTDR apparatus and COTDR measurement are designed to monitor one optical transmission line, and they are not intended to monitor a plurality of optical transmission lines in parallel.

The present invention has been accomplished in view of the foregoing, and an object of the present invention is thus to provide an optical transmission line monitoring apparatus, an optical transmission line monitoring system, and an optical transmission line monitoring method capable of monitoring a plurality of optical transmission lines in parallel.

Solution to Problem

An optical transmission line monitoring apparatus according to one aspect of the present invention includes a monitoring light output unit configured to output a plurality of monitoring lights with different frequencies to a plurality of first optical transmission lines, respectively, a local oscillation light source configured to output a local oscillation light, an interference unit, to which a plurality of return lights corresponding to the plurality of monitoring lights are input, configured to output an output light generated by interference between input lights and the local oscillation light, a conversion unit configured to convert the output light into an electrical signal, and a signal processing unit configured to extract, from the electrical signal, a signal having beat frequencies respectively based on the plurality of monitoring lights, and generate a monitoring result of each of the first optical transmission lines from the signal having the beat frequencies.

An optical transmission line monitoring system according to one aspect of the present invention includes an optical transmission apparatus configured to output an optical signal to a plurality of first optical transmission lines, and an optical transmission line monitoring apparatus connected to the optical transmission apparatus and configured to monitor the plurality of first optical transmission lines, wherein the optical transmission line monitoring apparatus includes a monitoring light output unit configured to output a plurality of monitoring lights with different frequencies to a plurality of first optical transmission lines, respectively, a local oscillation light source configured to output a local oscillation light, an interference unit, to which a plurality of return lights corresponding to the plurality of monitoring lights are input, configured to output an output light generated by interference between input lights and the local oscillation light, a conversion unit configured to convert the output light into an electrical signal, and a signal processing unit configured to extract, from the electrical signal, a signal having beat frequencies respectively based on the plurality of monitoring lights, and generate a monitoring result of each of the first optical transmission lines from the signal having the beat frequencies.

An optical transmission line monitoring method according to one aspect of the present invention includes outputting a plurality of monitoring lights with different frequencies to a plurality of first optical transmission lines, respectively, outputting an output light generated by interference between a plurality of return lights corresponding to the plurality of monitoring lights and a local oscillation light, converting the output light into an electrical signal, and extracting, from the electrical signal, a signal having beat frequencies respectively based on the plurality of monitoring lights, and generating a monitoring result of each of the first optical transmission lines from the signal having the beat frequencies.

Advantageous Effects of Invention

According to the present invention, there are provided an optical transmission line monitoring apparatus, an optical transmission line monitoring system, and an optical transmission line monitoring method capable of monitoring a plurality of optical transmission lines in parallel.

BRIEF DESCRIPTION OF DRAWINGS

FIG. 16 is a view schematically showing a table in a control unit.

DESCRIPTION OF EMBODIMENTS

Example embodiments of the present invention will be described hereinafter with reference to the drawings. In the description of the drawings the same elements will be denoted by the same reference symbols and redundant description will be omitted where needed.

First Example Embodiment

An optical transmission line monitoring apparatus 100 according to a first example embodiment is described hereinafter. The optical transmission line monitoring apparatus 100 detects a failure in an optical transmission line that constitutes various optical networks such as a submarine optical network, for example. The optical transmission line monitoring apparatus 100 detects a failure in an optical transmission line, for example, by outputting an optical pulse, which is a monitoring light, to an optical transmission line connected to a light transmission apparatus placed in a terminal station and measuring the intensity of its return light.

Figure 1:
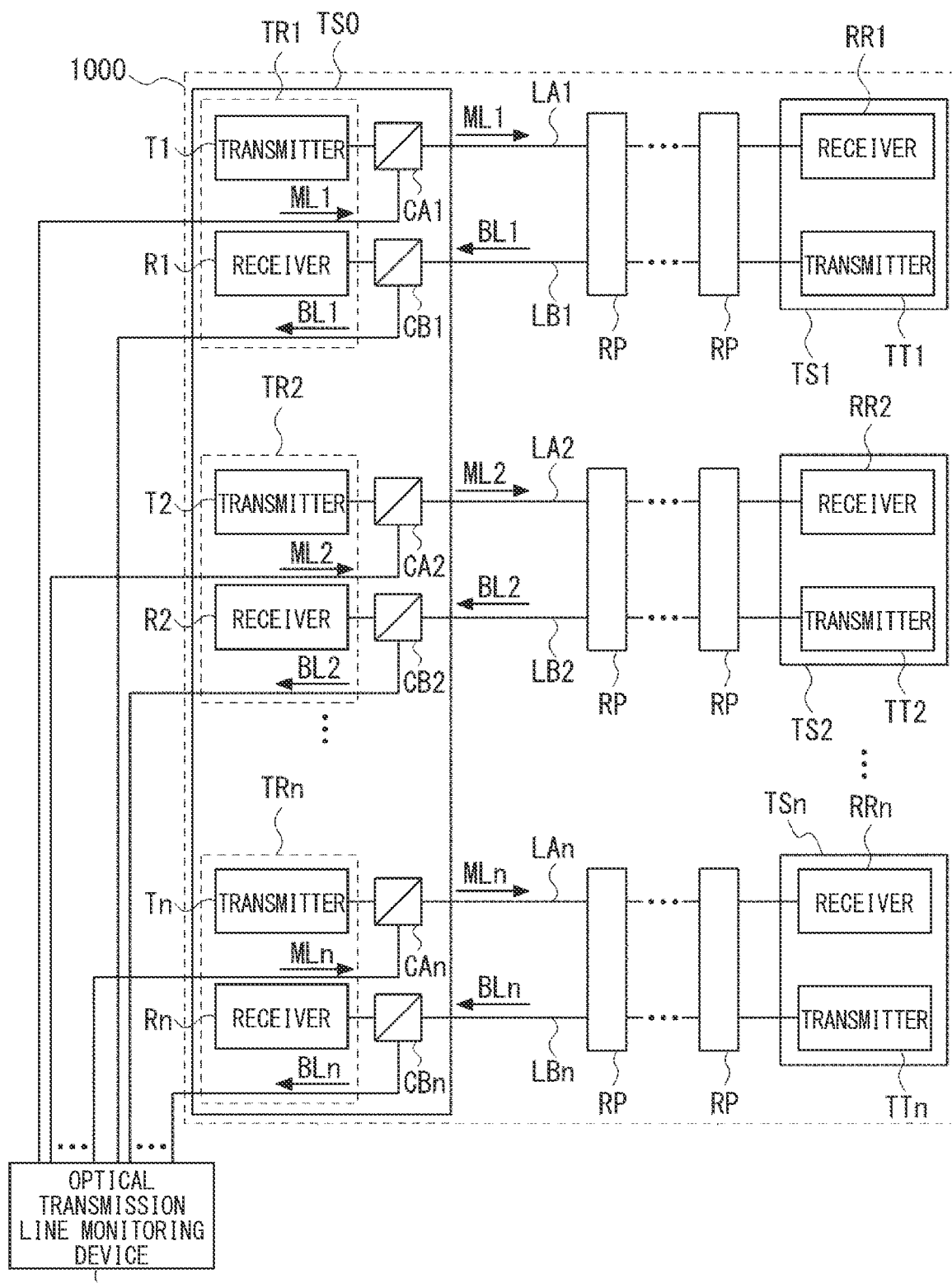
FIG. 1 is a view showing connections when monitoring an optical network by an optical transmission line monitoring apparatus according to a first example embodiment.

FIG. 1 shows connections when monitoring an optical network 1000 by the optical transmission line monitoring apparatus 100 according to the first example embodiment. A terminal station TS0 is connected to a plurality of terminal stations TS1 to TSn (n is an integer of 2 or more) through optical transmission lines. Note that the terminal stations TS1 to TSn are not limited to separate terminal stations, and some or all of the terminal stations TS1 to TSn may be regarded as a plurality of light transmission apparatuses installed in one terminal station.

The terminal station TS0 includes a plurality of light transmission apparatuses TR1 to TRn. The light transmission apparatuses TR1 to TRn include transmitters T1 to Tn and receivers R1 to Rn, respectively. The terminal stations TS1 to TSn include transmitters TT1 to TTn and receivers RR1 to RRn, respectively.

Optical signals that are output from the transmitters T1 to Tn are transmitted to the receivers RR1 to RRn of the terminal stations TS1 to TSn, respectively, through optical transmission lines LA1 to LAn (which are referred to also as first optical transmission lines). Optical signals that are output from the transmitters TT1 to TTn of the terminal stations TS1 to TSn are transmitted to the receivers R1 to Rn of the terminal station TS0, respectively, through optical transmission lines LB1 to LBn (which are referred to also as second optical transmission lines). In other words, the optical transmission line LAk (k is an integer of 1 to n) and the optical transmission line LBk form a pair of optical transmission lines that connect the light transmission apparatus TRk of the terminal station TS0 and the terminal station TSk.

Figure 2:
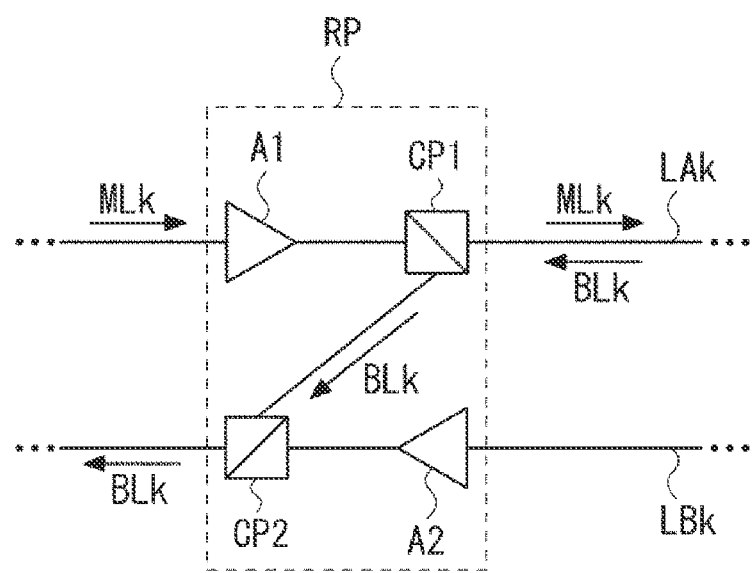
FIG. 2 is a view schematically showing the structure of an optical repeater.

One or more optical repeaters RP are inserted in the optical transmission line LAk and the optical transmission line LBk of the optical transmission line pair. FIG. 2 schematically shows the structure of the optical repeater RP. The optical repeater RP includes optical amplifiers A1 and A2 and couplers CP1 and CP2.

The optical amplifier A1 is inserted in the optical transmission line LAk, and amplifies an optical signal that is transmitted toward the terminal station TSk through the optical transmission line LAk.

The coupler CP1 is configured as a directional coupler or an optical circulator, for example. The coupler CP1 is inserted in the subsequent stage of the optical amplifier A1, and selectively branches an optical signal (i.e., return light BLk, which is described later) that propagates in the opposite direction to the optical signal that is transmitted toward the terminal station TS0 through the optical transmission line LAk, and outputs the branched optical signal to the coupler CP2.

The optical amplifier A2 is inserted in the optical transmission line LBk, and amplifies an optical signal that is transmitted through the optical transmission line LBk.

The coupler CP2 is configured as a directional coupler or an optical circulator, for example. The coupler CP2 is inserted in the subsequent stage of the optical amplifier A2, and couples the optical signal (i.e., return light BLk, which is described later) that is output from the coupler CP1 to the optical transmission line LBk. The coupled optical signal (i.e., return light BLk, which is described later) is transmitted to the terminal station TS0 through the optical transmission line LBk. Note that the coupler CP2 may be inserted in the previous stage of the optical amplifier A2, and the coupler CP2 may couple the optical signal (i.e., return light BLk, which is described later) that is output from the coupler CP1 to the optical transmission line LBk, so that the coupled light (feedback light BLk) is input to the optical amplifier A2. In this case, the optical amplifier A2 may amplify and output the input light (feedback light BLk).

The optical transmission line monitoring apparatus 100 is connected to the terminal station TS0 in order to detect a failure in the optical transmission lines LA1 to LAn. In the terminal station TS0, couplers CA1 to CAn are inserted in the subsequent stage of the transmitters T1 to Tn, respectively. The couplers CA1 to CAn are connection ports of the optical transmission line monitoring apparatus 100, and configured as a directional coupler or an optical circulator, for example. The couplers CA1 to CAn couple monitoring lights ML1 to MLn with different frequencies that are output from the optical transmission line monitoring apparatus 100 to the optical transmission lines LA1 to LAn, respectively. The monitoring lights ML1 to MLn are thereby transmitted toward the terminal stations TS1 to TSn, respectively, through the optical transmission lines LA1 to LAn.

Further, in the terminal station TS0, couplers CB1 to CBn are inserted in the previous stage of the receivers R1 to Rn, respectively. The couplers CB1 to CBn are connection ports of the optical transmission line monitoring apparatus 100, and configured as a directional coupler or an optical circulator, for example.

As described earlier, when the monitoring lights ML1 to MLn are output to the optical transmission lines LA1 to LAn, respectively, feedback lights BL1 to BLn that propagate in the opposite direction to the monitoring lights ML1 to MLn are generated due to Rayleigh scattering (backscattering) in the optical transmission lines LA1 to LAn. The feedback lights BL1 to BLn are branched from the optical transmission lines LA1 to LAn by the optical repeater RP, then coupled to the optical transmission lines LB1 to LBn, and transmitted to the couplers CB1 to CBn, respectively. Note that the feedback light may contain not only scattered light generated by Rayleigh scattering but also scattered light generated by another scattering such as Brillouin scattering or Raman scattering, or may contain reflected light.

The couplers CB1 to CBn branch the return lights BL1 to BLn with different frequencies, respectively, and output them to the optical transmission line monitoring apparatus 100.

Figure 3:
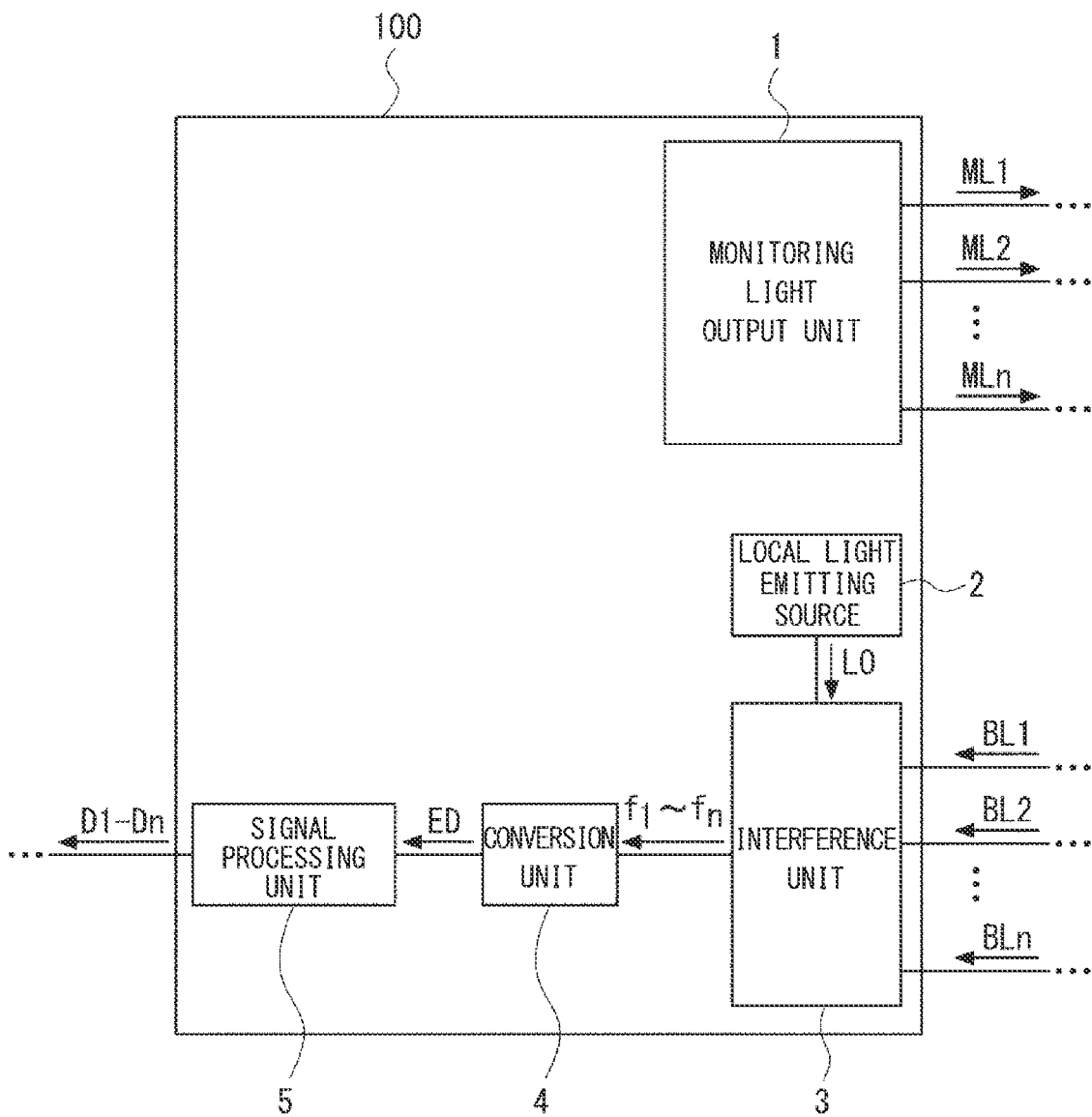
FIG. 3 is a view schematically showing the structure of the optical transmission line monitoring apparatus according to the first example embodiment.

The optical transmission line monitoring apparatus 100 according to this example embodiment detects the intensity of the received return lights BL1 to BLn with different frequencies and thereby detects a failure in the optical transmission lines LA1 to LAn. The optical transmission line monitoring apparatus 100 is specifically described hereinbelow. FIG. 3 schematically shows the structure of the optical transmission line monitoring apparatus 100 according to the first example embodiment. The optical transmission line monitoring apparatus 100 includes a monitoring light output unit 1, a local oscillation light source 2, an interference unit 3, a conversion unit 4, and a signal processing unit 5.

The monitoring light output unit 1 outputs the monitoring lights ML1 to MLn with different frequencies to the optical transmission lines LA1 to LAn, respectively. The monitoring light output unit 1 may sequentially output the monitoring lights ML1 to MLn with different frequencies one after another, or may simultaneously output some or all of the monitoring lights ML1 to MLn.

Figure 4:
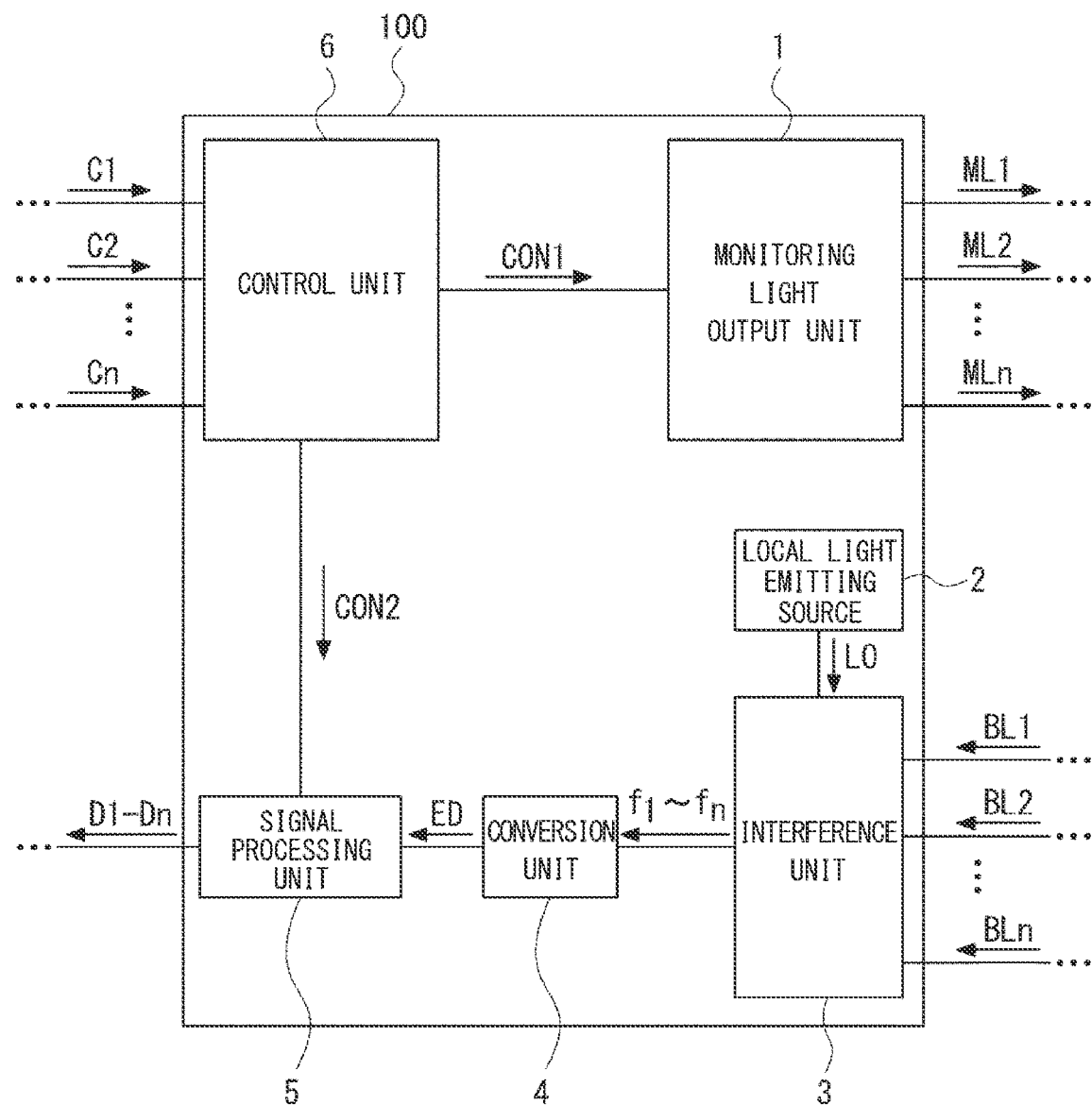
FIG. 4 is a view showing in more detail the structure of the optical transmission line monitoring apparatus according to the first example embodiment.

Note that the output operation of the monitoring light output unit 1 that outputs the monitoring lights ML1 to MLn may be controlled by a control unit included in the optical transmission line monitoring apparatus 100. FIG. 4 shows in more detail the structure of the optical transmission line monitoring apparatus 100 according to the first example embodiment. As shown in FIG. 4, the optical transmission line monitoring apparatus 100 may include a control unit 6. In this example, control signals C1 to Cn for controlling the frequency and the output timing of the monitoring lights ML1 to MLn, respectively, are applied to the control unit 6. On the basis of the control signals C1 to Cn, the control unit 6 outputs a control signal CON1 to the monitoring light output unit 1. On the basis of the control signal CON1, the monitoring light output unit 1 controls the frequencies of the monitoring lights ML1 to MLn and outputs the monitoring lights ML1 to MLn at specified timing.

Figure 5:
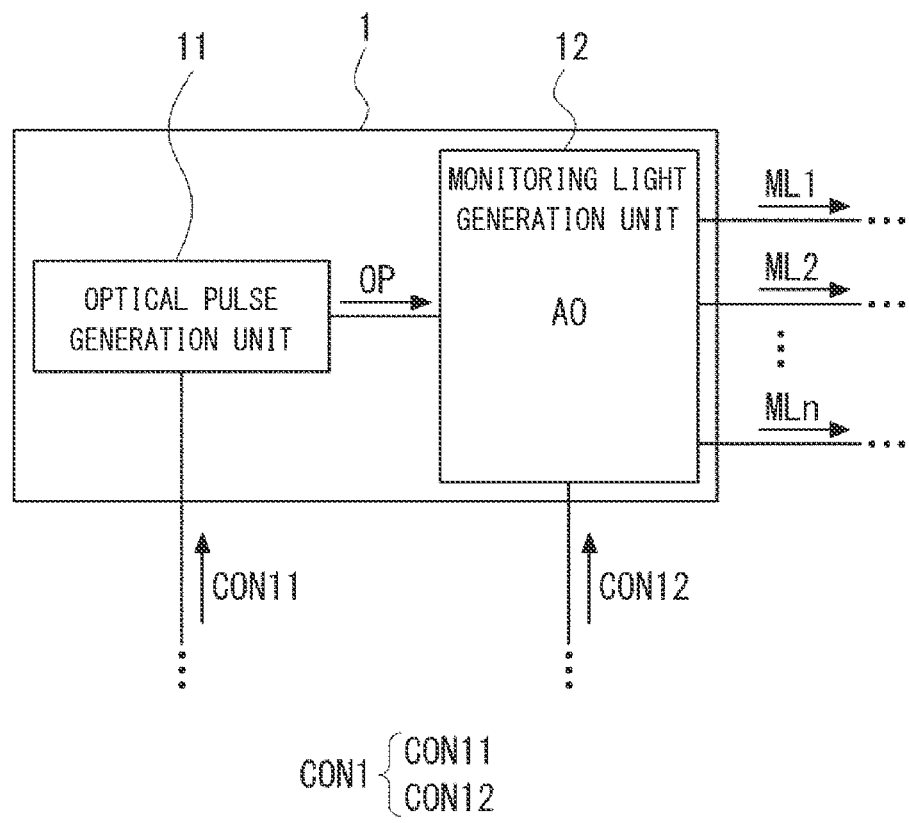
FIG. 5 is a view schematically showing the structure of a monitoring light output unit according to the first example embodiment.

FIG. 5 schematically shows the structure of the monitoring light output unit 1 according to the first example embodiment. The monitoring light output unit 1 includes an optical pulse generation unit 11 and a monitoring light generation unit 12. In this example, the control signal CON1 contains control signals CON 11 and CON 12, and the control signal CON 11 is applied to the optical pulse generation unit 11, and the control signal CON 12 is applied to the monitoring light generation unit 12.

The optical pulse generation unit 11 includes a light source such as a laser element, and outputs an optical pulse OP to the monitoring light generation unit 12 on the basis of the control signal CON 11.

The monitoring light generation unit 12 converts the frequency of the optical pulse OP and generates a monitoring light on the basis of the control signal CON 12, and outputs the generated monitoring light to any one of the optical transmission lines LA1 to LAn. The monitoring light generation unit 12 may be configured as an acousto-optic element, for example. The acousto-optic element can modulate the intensity of the received optical pulse OP and deflect the optical pulse OP (path control). Further, the acousto-optic element can shift the frequency of the optical pulse OP depending on the frequency of an applied acoustic wave (frequency conversion). Thus, using the frequency $f_0$ of the optical pulse OP as a reference, the monitoring lights ML1 to MLn with different frequencies $f_1$ to $f_n$ can be output to the optical transmission lines LA1 to LAn, respectively. Note that any of the frequencies $f_1$ to $f_n$ may be the same as the frequency $f_0$.

The local oscillation light source 2 includes a light source such as a laser element and outputs a local oscillation light LO with a frequency $f_{LO}$ to the interference unit 3. The local oscillation light output operation of the local oscillation light source 2 may be controlled by a control signal that is supplied from the control unit 6.

The return lights BL1 to BLn (with the frequencies $f_1$ to $f_n$) are input to the interference unit 3 from the optical transmission lines LB1 to LBn, and the interference unit 3 outputs an output light generated by interference between the local oscillation light LO and the return lights BL1 to BLn. The light that is output from the interference unit 3 thereby contains components having beat frequencies $|f_{LO}-f_1|$ to $|f_{LO}-f_n|$ that are generated by the interference between the return lights BL1 to BLn and the local oscillation light LO.

Figure 6:
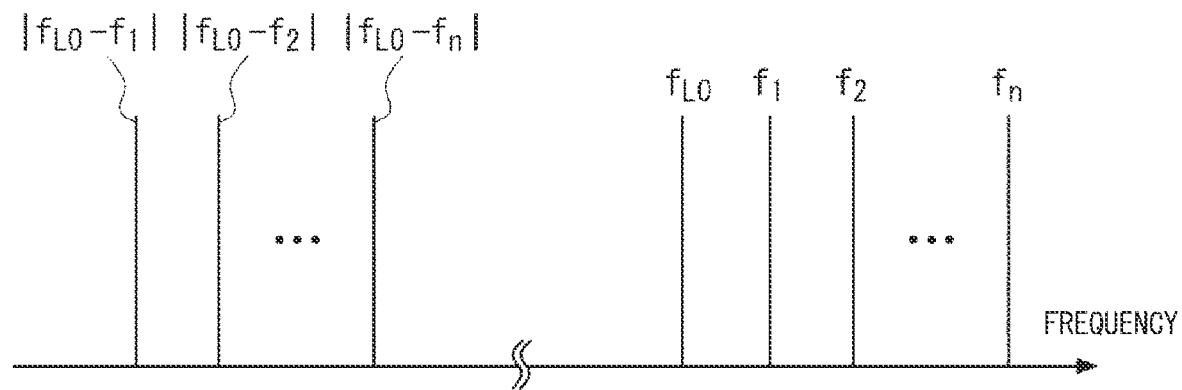
FIG. 6 is a view showing the relationship of the frequency of a return light, the frequency of a local oscillation light, and an intermediate frequency.

FIG. 6 shows the relationship of the frequencies of the return lights BL1 to BLn (the frequencies $f_1$ to $f_n$), the frequency $f_{LO}$ of the local oscillation light LO, and $|f_{LO}-f_1|$ to $|f_{LO}-f_n|$. When two lights having different frequencies interfere, beats are generated. The frequency of the beats is the beat frequency. As shown in FIG. 6, when the return lights BL1 to BLn with the frequencies $f_1$ to $f_n$ and the local oscillation light LO with the frequency $f_{LO}$ interfere, frequency components with the beat frequencies of $|f_{LO}-f_1|$ to $|f_{LO}-f_n|$ are generated, respectively.

Since the return lights BL1 to BLn are not necessarily simultaneously input to the interference unit 3, any one or some of the return lights BL1 to BLn interfere with the local oscillation light LO in the interference unit 3 depending on the frequency of the output monitoring light. However, all of the return lights BL1 to BLn may simultaneously interfere with the local oscillation light LO as a matter of course.

Figure 7:
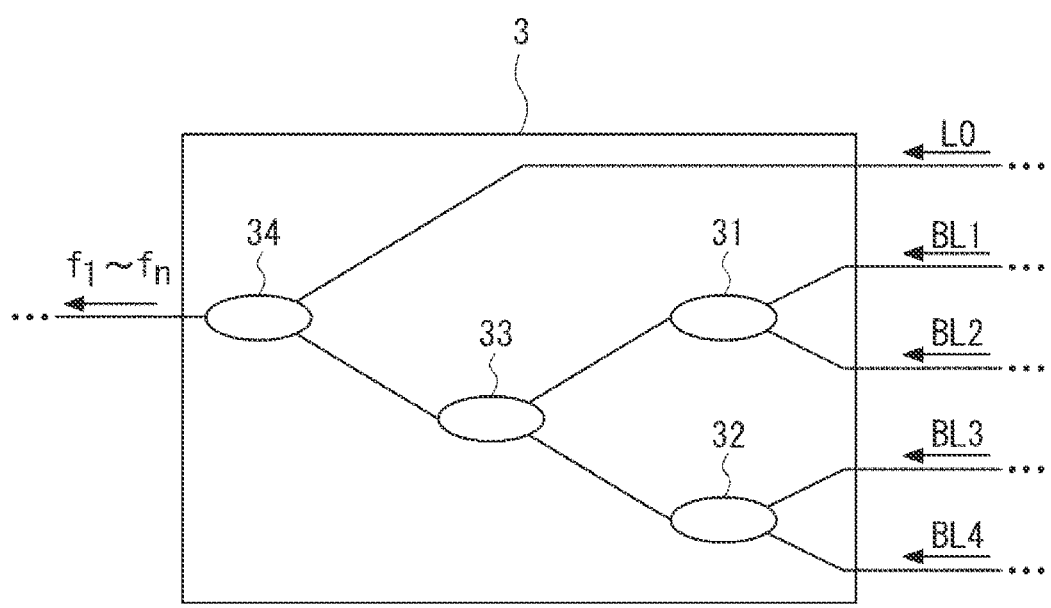
FIG. 7 is a view schematically showing an example of the structure of an interference unit according to the first example embodiment.

FIG. 7 schematically shows an example of the structure of the interference unit 3 according to the first example embodiment. In order to simplify the description, an example where four return lights and the local oscillation light LO are input to the interference unit 3 is described hereinafter. The interference unit 3 includes couplers 31 to 34. The couplers 31 to 34 are configured as 2-input 1-output couplers. The couplers 31 to 34 are arranged in a cascade in order to multiplex the return lights BL1 to BL4 into one (guide them to one propagation path).

The return light BL1 and the return light BL2 are input to the coupler 31, and its output is connected to one input of the coupler 33. The return light BL3 and the return light BL4 are input to the coupler 32, and its output is connected to the other input of the coupler 33. The output of the coupler 33 is connected to one input of the coupler 34. The other input of the coupler 34 is connected to the local oscillation light source 2 and the local oscillation light LO is input thereto, and its output is connected to the conversion unit 4.

Although the case where the return lights with four different frequencies are input is described above, the structure that causes the return lights with two, three, five or more different frequencies with the local oscillation light LO can be achieved by changing the number of couplers and the number of cascade connections.

Figure 8:
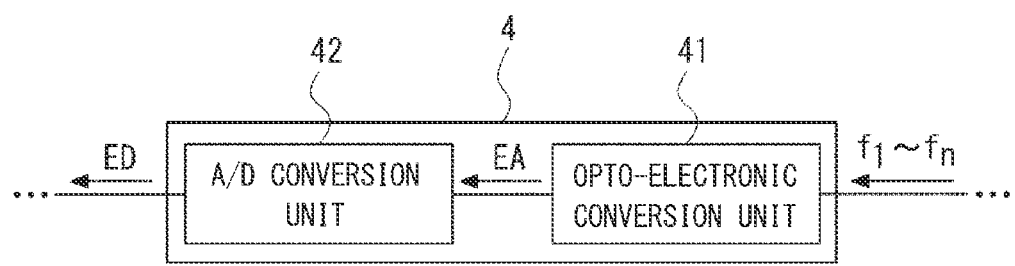
FIG. 8 is a view schematically showing the structure of a conversion unit according to the first example embodiment.

The conversion unit 4 converts the output light that is output from the interference unit 3 into an analog electrical signal EA, further converts the analog electrical signal EA into a digital electrical signal ED, and outputs this signal to the signal processing unit 5. FIG. 8 schematically shows the structure of the conversion unit 4 according to the first example embodiment. The conversion unit 4 includes a photoelectronic conversion unit 41 and an analog-to-digital (A/D) conversion unit 42.

The photoelectronic conversion unit 41 may be configured using a photodiode and a transimpedance amplifier, for example. The photodiode converts the output light that is output from the interference unit 3 into a current signal. The transimpedance amplifier converts the current signal into the analog electrical signal EA, which is a voltage signal, amplifies the signal, and outputs this signal to the A/D conversion unit 42. The A/D conversion unit 42 converts the analog electrical signal EA into the digital electrical signal ED, and outputs this signal to the signal processing unit 5.

The signal processing unit 5 separates the signal components having the beat frequencies $|f_{LO}-f_1|$ to $|f_{LO}-f_n|$ that are contained in the digital electrical signal ED and performs signal processing, and then outputs data signals D1 to Dn indicating their detection results.

Figure 9:
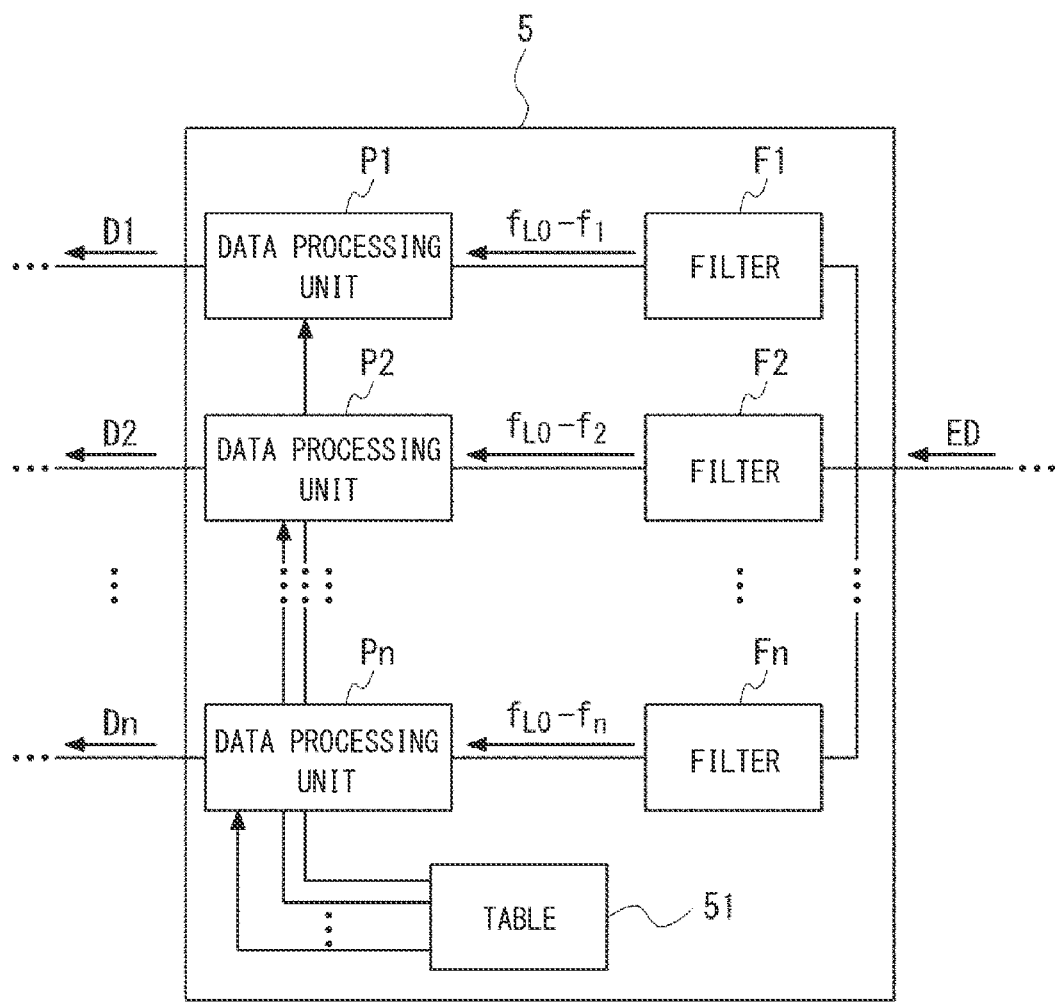
FIG. 9 is a view schematically showing the structure of a signal processing unit according to the first example embodiment.

FIG. 9 schematically shows the structure of the signal processing unit 5 according to the first example embodiment. The signal processing unit 5 includes filters F1 to Fn and data processing units P1 to Pn. The digital electrical signal ED is input to the filters F1 to Fn, and the filters F1 to Fn cause the signal components corresponding to the beat frequencies $|f_{LO}-f_1|$ to $|f_{LO}-f_n|$ to pass therethrough, respectively. The signals that have passed through the filters F1 to Fn are processed by the data processing units P1 to Pn, respectively, and converted into the data signals D1 to Dn and then output.

As described above, the filters F1 to Fn respectively cause signals with the specified beat frequencies $|f_{LO}-f_1|$ to $|f_{LO}-f_n|$ to pass therethrough, which ensures that the data signals D1 to Dn correspond to the monitoring lights ML1 to MLn, i.e., the optical transmission lines LA1 to LAn.

In the case where the pass frequencies of the filters F1 to Fn are fixed, the data processing units P1 to Pn can appropriately output the data signals D1 to Dn corresponding to the optical transmission lines LA1 to LAn, respectively, by associating the pass frequencies of the filters F1 to Fn with the optical transmission lines LA1 to LAn. This may be implemented by providing the signal processing unit 5 with a table 51 that represents the association between the pass frequencies of the filters F1 to Fn and the optical transmission lines LA1 to LAn, so that the data processing units P1 to Pn refer to the table 51 as appropriate. Further, when the frequency of a monitoring light to be assigned to each system is changed, the association defined by the table may be updated as appropriate according to this change. Note that the data signals D1 to Dn are not necessarily output to one destination (for example, one administrator terminal). Specifically, the data signals D1 to Dn may be output to an arbitrary destination, such as a plurality of corresponding destinations (for example, a plurality of administrator terminals), respectively.

When there is a possibility of changes in the frequencies $f_1$ to $f_n$ of the monitoring lights ML1 to MLn and the frequency $f_{LO}$ of the local oscillation light LO, the pass frequencies $|f_{LO}-f_1|$ to $|f_{LO}-f_n|$ of the filters F1 to Fn may be changed as appropriate. For example, the pass frequencies of the filters F1 to Fn are adjustable by applying the control signals C1 to Cn to the control unit 6 according to need, and then applying a control signal CON2 from the control unit 6 to the signal processing unit 5 on the basis of the control signals C1 to Cn.

As described above, even when some or all of the return lights BL1 to BLn with different frequencies are input to the interference unit 3 in a simultaneous or overlapping manner, the signal processing unit 5 is capable of separately monitoring the return lights on the basis of the beat frequencies, which allows monitoring the optical transmission lines LA1 to LAn in parallel. Thus, return lights with different frequencies do not need to be temporally discrete, which enables the frequent and high-speed detection of a failure in a plurality of optical transmission line pairs.

Figure 10:
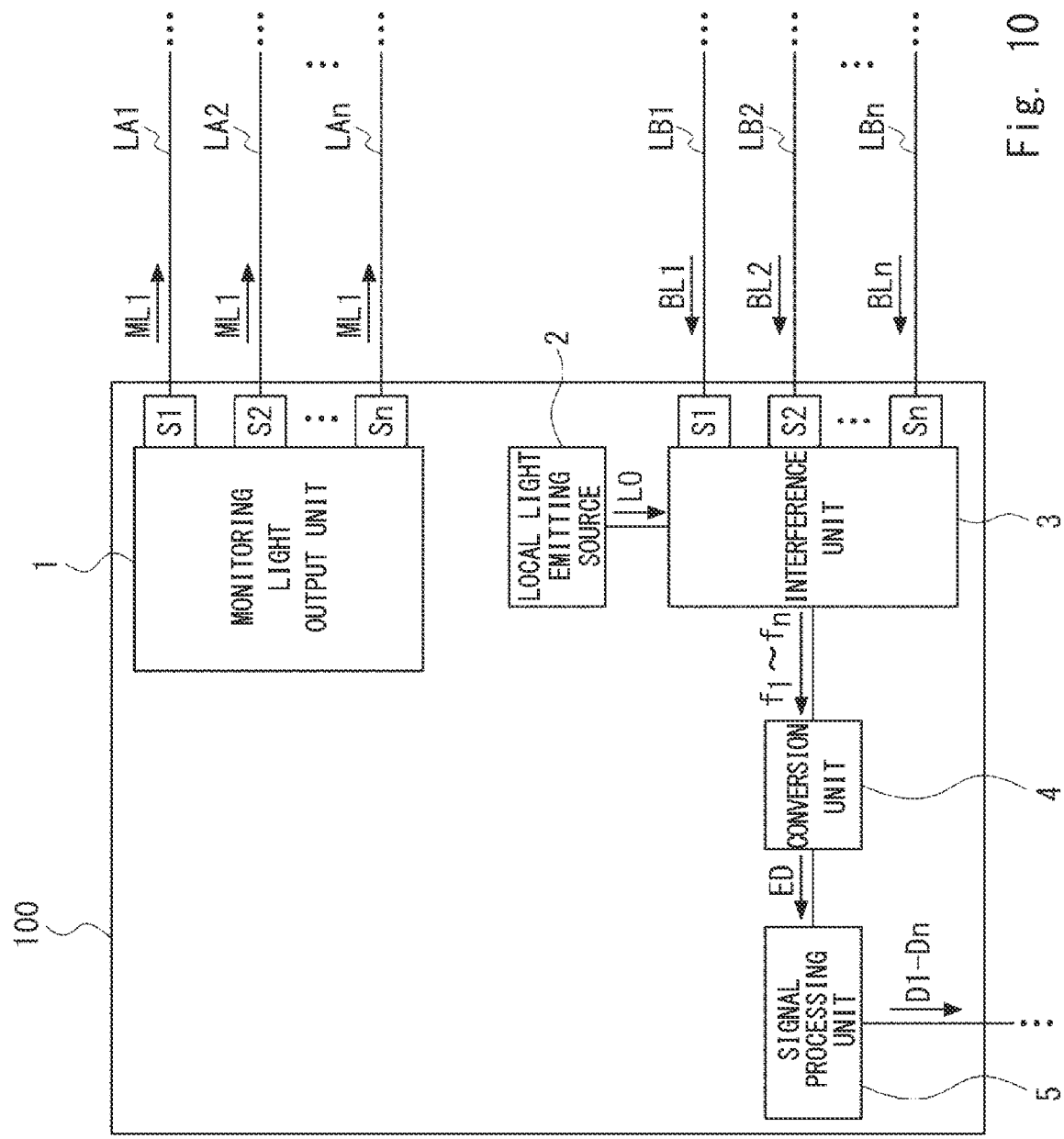
FIG. 10 is a view schematically showing the relationship of optical transmission lines, monitoring lights, and return lights according to the first example embodiment.

FIG. 10 schematically shows the relationship of the optical transmission lines, the monitoring lights, and the return lights in the first example embodiment. As shown in FIG. 10, the monitoring lights ML1 to MLn with the frequencies $f_1$ to $f_n$ are sequentially output to the optical transmission lines LA1 to LAn, and the return lights BL1 to BLn that are generated by scattering of the monitoring lights ML1 to MLn return to the optical transmission line monitoring apparatus 100 through the optical transmission lines LB1 to LBn. In this example, a communication system composed of the optical transmission line LAk, and the terminal station TSk and the optical transmission line LBk corresponding thereto is referred to as a system Sk.

Figure 11:
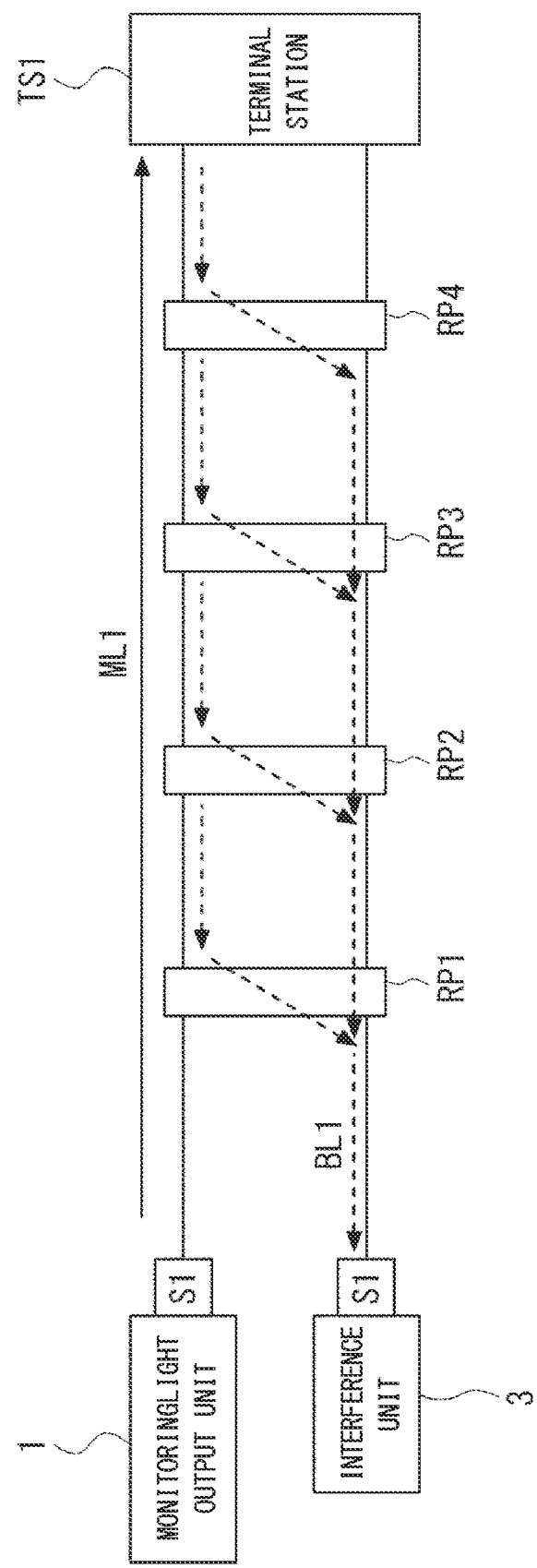
FIG. 11 is a view showing a return light generation mechanism according to the first example embodiment.

FIG. 11 shows a return light generation mechanism in a system S1 according to the first example embodiment. FIG. 11 shows an example where four optical repeaters RP1 to RP4 are inserted sequentially, from the side of the optical transmission line monitoring apparatus 100, in the optical transmission lines LA1 and LB1 of the system S1. As described earlier with reference to FIG. 2, the monitoring light ML1 that is transmitted to the terminal station TS1 through the optical transmission line LA1 is amplified each time passing through the optical repeater RP. The return light that is generated as a result that the amplified monitoring light ML1 is scattered returns to the optical repeater, is branched from the optical transmission line LA1 and coupled to the optical transmission line LB1 by a loopback path composed of couplers CP1 and CP2, and then returns to the optical transmission line monitoring apparatus 100.

Figure 12:
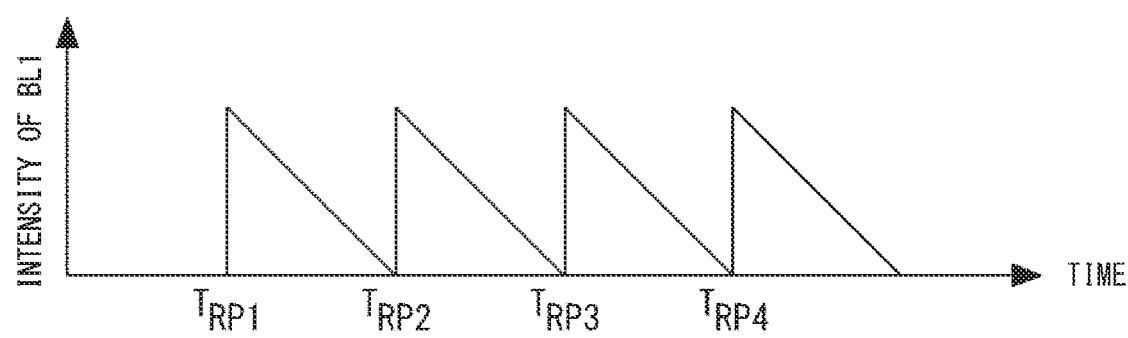
FIG. 12 is a view showing an example of the waveform of a return light.

As a result, the observation of an intensity change of the return light BL1 shows that it has a sawtooth waveform where the number of rises is the same as the number of optical repeaters RP1. FIG. 12 shows an example of the waveform of the return light BL1. In FIG. 12, the return light BL abruptly increases and rises at timing $T_{RP1} \sim T_{RP4}$. The rises at the timing $T_{RP1}$ to $T_{RP4}$ correspond to the amplification of the monitoring light ML by the optical repeaters RP1 to RP4. Although the interval between the adjacent rises is the same in FIG. 12, the interval between the rises may vary depending on the distance between the adjacent optical repeaters. Such a technique of monitoring optical transmission lines is expected to be effective in a submarine optical network in which the transmission distance is long and a plurality of optical repeaters are inserted in the optical transmission lines.

Figure 13:
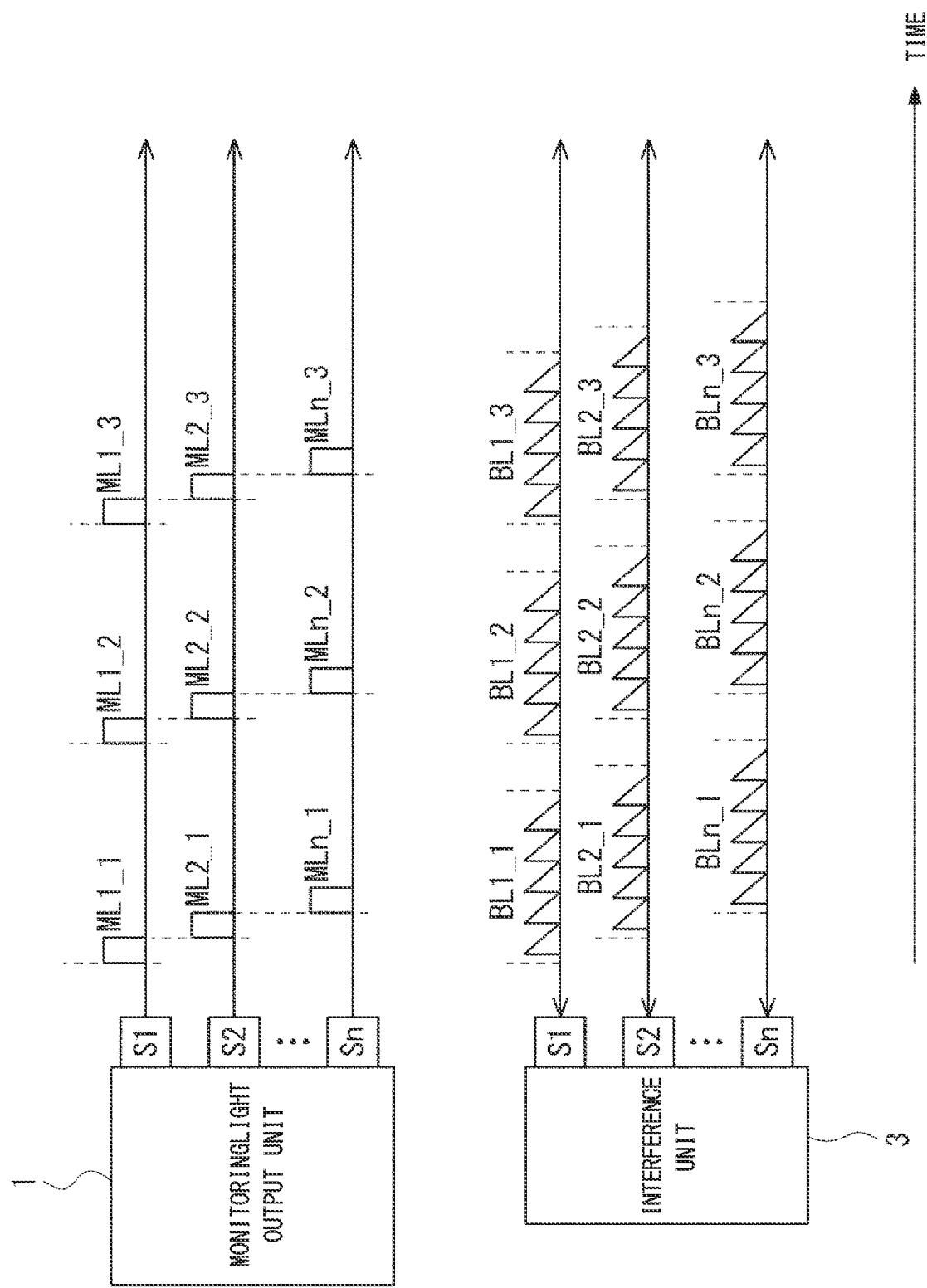
FIG. 13 is a view schematically showing the transmission of monitoring lights and return lights according to the first example embodiment.

FIG. 13 schematically shows the transmission of monitoring lights and return lights according to the first example embodiment. It shows an example where three pulses MLk_1 to MLk_3 are repeatedly output as the monitoring lights MLk, and three return lights BLk_1 to BLk corresponding to the respective pulses are fed back to the optical transmission line monitoring apparatus 100.

In the example of FIG. 13, return lights BL1_1 to BLn_1 respectively corresponding to monitoring lights ML1_1 to MLn_1 temporally overlap. As described earlier, even when the return lights BL1_1 to BLn_1 with different frequencies overlap, the signal processing unit 5 is capable of separating the frequencies of the return lights and detecting their intensity changes in parallel. Thus, return lights with different frequencies do not need to be temporally discrete, which enables the frequent and high-speed detection of a failure in a plurality of optical transmission line pairs.

Figure 14:
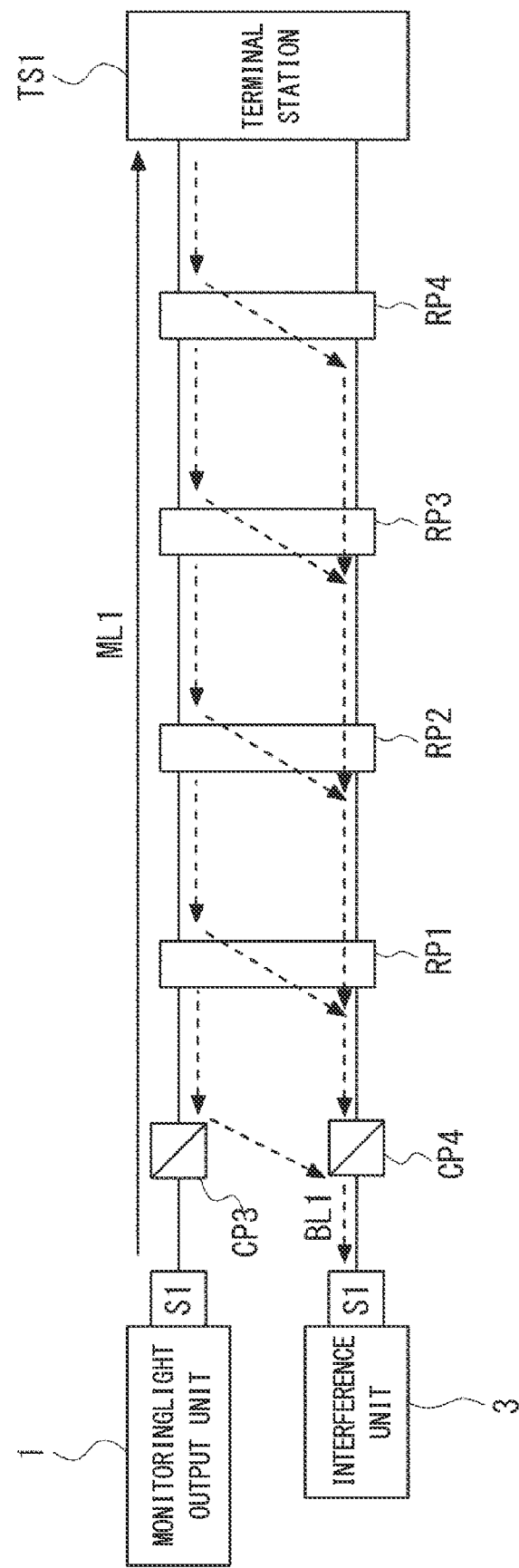
FIG. 14 is a view showing a modified example of the optical transmission line monitoring apparatus according to the first example embodiment.

Further, couplers may be placed inside the terminal station TS0 or between the terminal station TS0 and the closest optical repeater, so that a return light that is generated between the optical transmission line monitoring apparatus 100 and the closest optical repeater is detectable. FIG. 14 shows a modified example of the optical transmission line monitoring apparatus 100 according to the first example embodiment. As shown in FIG. 14, in the terminal station TS0, a coupler CP3 is inserted in the optical transmission lines LA1 to LAn, and a coupler CP4 is inserted in the optical transmission lines LB1 to LBn. The couplers CP3 and CP4 are configured as a directional coupler or an optical circulator.

In the structure show in FIG. 14, the return light from a position nearer than the closest optical repeater RP1 is selectively branched from the optical transmission lines LA1 to LAn by the coupler CP3, and coupled to the optical transmission lines LB1 to LBn by the coupler CP4. In other words, the couplers CP3 and CP4 form a loopback path, just like the couplers CP1 and CP2 of the optical repeaters RP1 to RPn.

As shown in FIG. 14, by placing the couplers CP3 and CP4 in the terminal station TS0, monitoring of the optical transmission lines is done without inserting the optical repeaters (optical repeaters RP1 to RPn in FIG. 14) in the optical transmission lines. As described earlier, when the monitoring lights ML1 to MLn are output to the optical transmission lines LA1 to LAn, respectively, the return lights BL1 to BLn that propagate in the opposite direction to the monitoring lights ML1 to MLn are generated due to Rayleigh scattering (backscattering) in the optical transmission lines LA1 to LAn. The return lights BL1 to BLn reach the coupler C3 of the terminal station TS0 without being branched by the optical repeater. The return lights BL1 to BLn that have reached the coupler CP3 are selectively branched from the optical transmission lines LA1 to LAn by the coupler CP3, and coupled to the optical transmission lines LB1 to LBn by the coupler CP4. This enables monitoring of the optical transmission lines even when optical repeaters are not inserted in the optical transmission lines.

Figure 15:
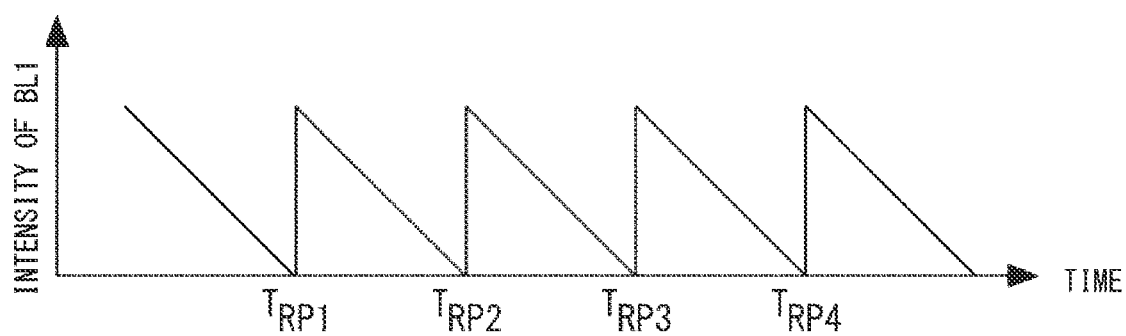
FIG. 15 is a view showing an example of the waveform of a return light in the structure shown in FIG. 13.

FIG. 15 shows an example of the waveform of the return light BL1 in the structure shown in FIG. 14. Compared with the structure shown in FIG. 11, this structure enables detecting an intensity change of the return light from a position nearer than the closest optical repeater RP1 (timing $T_{RP1}$) and thereby detecting a failure in the optical transmission line occurring nearby.

As described above, in this structure, lights (monitoring lights, return lights) with different frequencies are respectively assigned to a plurality of paths, and the beat frequencies corresponding to the frequencies of return lights are identified in the signal processing unit 5, which enables the plurality of paths to be separately monitored in parallel.

Note that the control signals C1 to Cn may be assigned to different users. Therefore, there can be a case where the control signals C1 to Cn are randomly applied to the control unit 6. For example, in the case where a certain user uses some of the above-described systems S1 to Sn, and another user uses other parts of the systems S1 to Sn, each user directs the control unit 6 to detect a failure of the system which this user is using at arbitrary timing by using some of the control signals C1 to Cn. When commands from a plurality of users reach the control unit 6 at substantially the same time, the control unit 6 may arbitrate between the plurality of commands and autonomously determine the output timing of the monitoring lights ML1 to MLn on the basis of the commands. For example, the output timing and intervals of the monitoring lights ML1 to MLn may be determined on the basis of the length of the optical transmission lines LA1 to LAn and the propagation speed of the monitoring lights ML1 to MLn through the optical transmission lines LA1 to LAn.

The control unit 6 may include a table 61 that defines the association of a user, a control signal, a system and a monitoring light. FIG. 16 schematically shows the table 61 included in the control unit 6. As shown in FIG. 16, in the table 61, a control signal C1, a system S1, and a monitoring light M1 are associated with a user U1, and control signals C2 and C3, systems S2 and S3, and monitoring lights M2 and M3 are associated with a user U2. Thus, the control signal C2 is assigned to the user U1, and the user U1 applies the control signal C1 to the control unit 6, thereby using the system S1 and controlling the monitoring light M1. Further, the control signals C2 and C3 are assigned to the user U1, and the user U1 applies the control signals C2 and C3 to the control unit 6, thereby using the systems S2 and S3 and controlling the monitoring lights M2 and M3.

Note that the table 61 represents the association of certain users, control signals, systems, and monitoring lights for simplification of the drawing, and it may contain the association of other users, control signals, systems, and monitoring lights as a matter of course.

Further, there can be a case where users are not assigned for all of the monitoring lights ML1 to MLn depending on the usage of the optical transmission line monitoring apparatus 100. In this case, a new user can request the assignment of a monitoring light to the control unit 6 by using the control signals C1 to Cn. In response to this request, the control unit 6 may assign an unused monitoring light to the new user. Further, the control unit 6 may determine the frequency of the assigned monitoring light. In this case, the control unit 6 may notify the signal processing unit 5 of the determined frequency of the monitoring light by using the control signal CON2, and the signal processing unit 5 may select a corresponding filter according to the notified frequency by referencing the above-described table, for example, and adjust the pass frequency of the corresponding filter.

Second Example Embodiment

In the first example embodiment, the example of sequentially outputting the monitoring lights ML1 to MLn with different frequencies $f_1$ to $f_n$ to the optical transmission lines LA1 to LAn is described. However, the order of outputting the monitoring lights ML1 to MLn is not limited thereto. A break detection operation of the optical transmission line monitoring apparatus 100 according to a second example embodiment is described hereinbelow.

Figure 17:
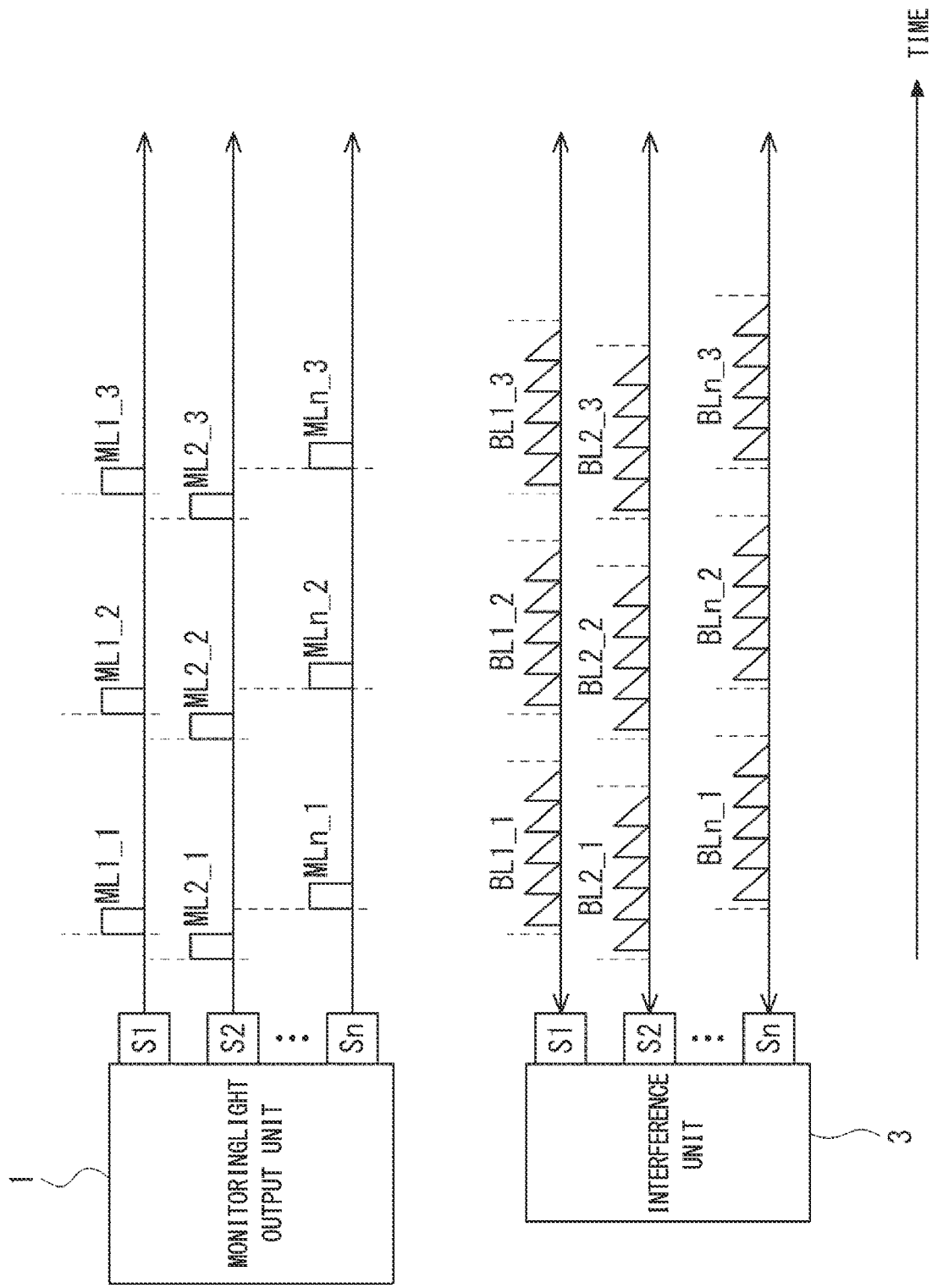
FIG. 17 is a view schematically showing propagation paths of monitoring lights and return lights according to a second example embodiment.

FIG. 17 schematically shows propagation paths of monitoring lights and return lights according to the second example embodiment. In this example, the order of outputting the monitoring light ML1 and the monitoring light ML2 is interchanged compared with the example of FIG. 13. Thus, return light BL2 is fed back to the optical transmission line monitoring apparatus 100 at earlier timing than the return light BL1.

In this case also, the return lights BL1_1 to BLn_1 respectively corresponding to the monitoring lights ML1_1 to MLn_1 temporally overlap. However, even when the monitoring lights ML1_1 to MLn_1 with different frequencies are output in any order and the corresponding return lights temporally overlap, the signal processing unit 5 is capable of separating the frequencies of the return lights and detecting their intensity changes in parallel.

Note that, since return lights can temporally overlap, even if the monitoring light output unit 1 simultaneously outputs monitoring lights with different frequencies, the signal processing unit 5 is capable of separating the frequencies of the return lights and detecting their intensity changes in parallel.

Third Example Embodiment

In the first example embodiment, the example of outputting the monitoring lights ML1 to MLn with different frequencies $f_1$ to $f_n$ sequentially and at the same intervals to the optical transmission lines LA1 to LAn is described. However, there can be a case where it is needed to control the output timing of monitoring light with different frequencies according to need. For example, in the case where users of systems having a plurality of optical transmission line pairs are not the same and users of the systems are different, there is a need for a function that allows each user to perform failure detection of the optical transmission lines at desired timing.

Figure 18:
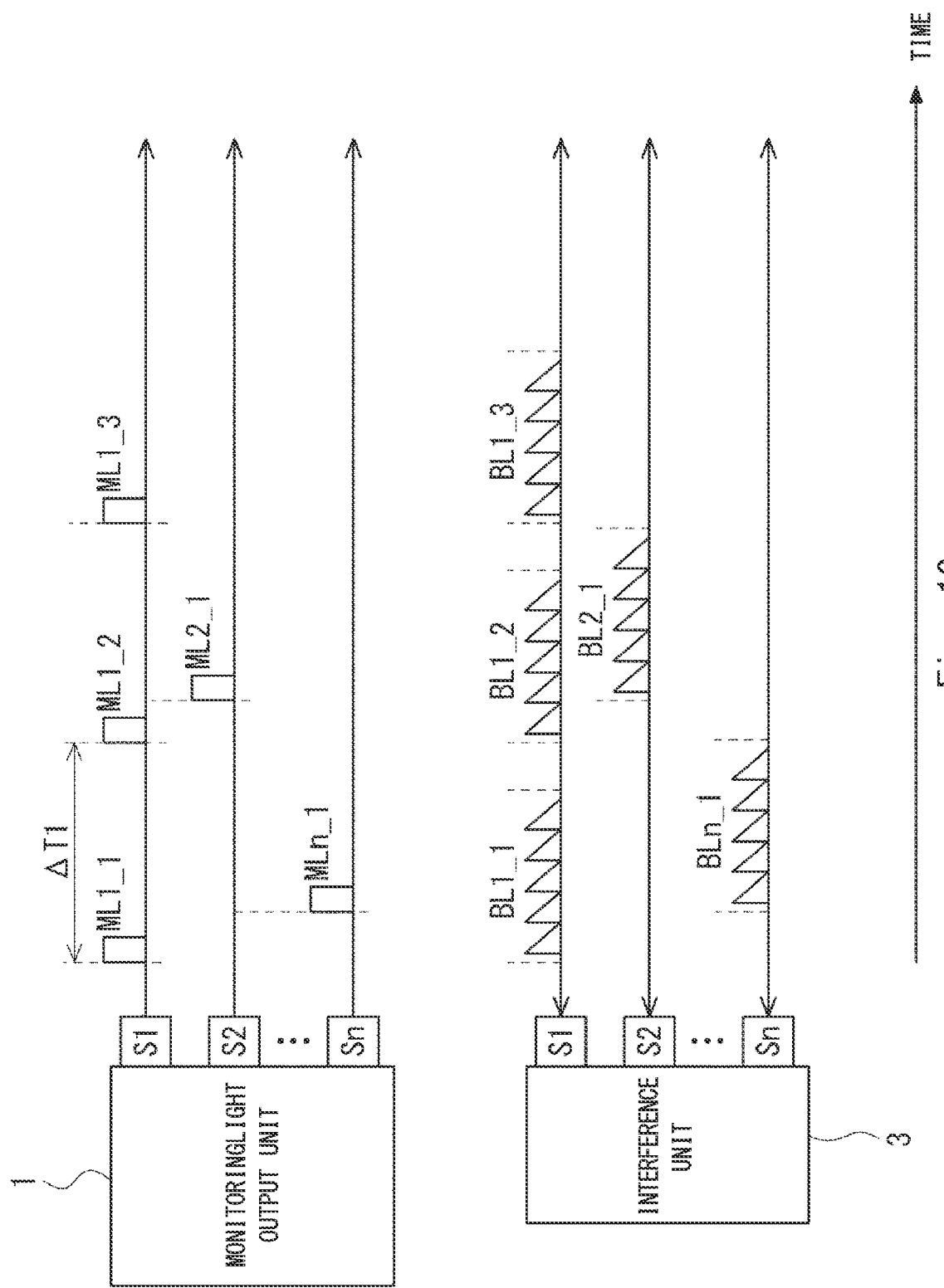
FIG. 18 is a view schematically showing propagation paths of monitoring lights and return lights according to a third example embodiment.

The operation of the optical transmission line monitoring apparatus 100 that performs failure detection of the optical transmission lines at desired timing is described hereinafter. FIG. 18 schematically shows propagation paths of monitoring lights and return lights according to a third example embodiment. The monitoring light ML1 is output repeatedly at intervals of $\Delta T1$. On the other hand, the monitoring lights ML2 to MLn are output at different intervals and timing from the monitoring light ML1. In this example, the first pulse of the monitoring light ML2 is output after the second pulse of the monitoring light ML1, and the first pulse of the monitoring light MLn is output after the first pulse of the monitoring light ML1.

In this structure, the output timing of each of the monitoring lights ML1 to MLn is controllable, for example, by applying the control signals C1 to Cn to the control unit 6 according to need, and then applying the control signal CON1 from the control unit 6 to the monitoring light output unit 1 on the basis of the control signals C1 to Cn.

In this case also, the return lights BL1 to BLn respectively corresponding to the monitoring lights ML1 to MLn sometimes temporally overlap. As with the above-described example embodiments, the signal processing unit 5 is capable of separating the frequencies of the return lights and detecting their intensity changes in parallel.

Thus, as with the first example embodiment, return lights with different frequencies do not need to be temporally discrete, which enables the frequent and high-speed detection of a failure in a plurality of optical transmission line pairs.

Fourth Example Embodiment

In the above-described example embodiments, the case where systems having a plurality of optical transmission line pairs have the same structure is described. In practice, however, the systems can have different structures, such as where the lengths of the optical transmission lines LA1 to LAn are different, the number of optical repeaters inserted is different, or the distance between optical repeaters is different.

Figure 19:
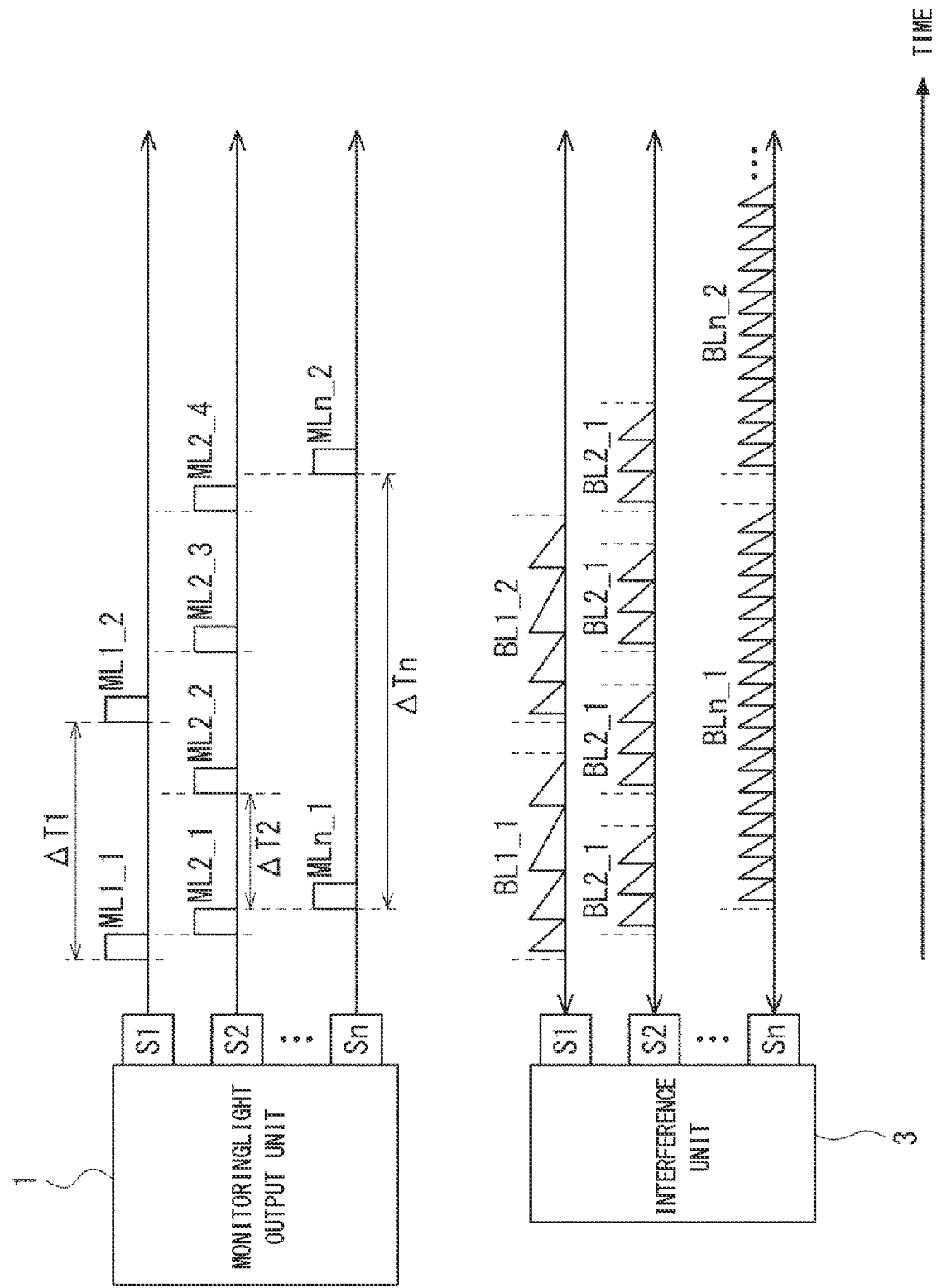
FIG. 19 is a view schematically showing propagation paths of monitoring lights and return lights according to a fourth example embodiment.

The operation of the optical transmission line monitoring apparatus 100 that performs failure detection of the optical transmission lines in accordance with the structure of each system is described hereinafter. FIG. 19 schematically shows propagation paths of monitoring lights and return lights according to a fourth example embodiment. In this example, the optical transmission line LA2 is shorter than the optical transmission line LA1, and the number of optical repeaters inserted is smaller. Further, the optical transmission line LAn is longer than the optical transmission line LA1, and the number of optical repeaters inserted is larger.

In this example embodiment, the output interval of each monitoring light is controlled in accordance with a difference in the structure of each system. In this example, the output interval $\Delta T2$ of the monitoring light ML2 that is output to the shorter optical transmission line LA2 is shorter than the output interval $\Delta T1$ of the monitoring light ML1 that is output to the optical transmission line LA1 ($\Delta T2<\Delta T1$). The output interval $\Delta Tn$ of the monitoring light MLn that is output to the longer optical transmission line LAn is longer than the output interval $\Delta T1$ of the monitoring light ML1 that is output to the optical transmission line LA1 ($\Delta Tn>\Delta T1$).

The return lights BL1 to BLn are fed back to the optical transmission line monitoring apparatus 100 at timing corresponding to the output timing of the monitoring lights ML1 to MLn, the length of the optical transmission lines LA1 to LAn or the like. In this case also, the return lights BL1 to BLn respectively corresponding to the monitoring lights ML1 to MLn sometimes temporally overlap. As with the above-described example embodiments, the signal processing unit 5 is capable of separating the frequencies of the return lights and detecting their intensity changes in parallel.

In this structure also, the output timing of each of the monitoring lights ML1 to MLn is controllable, for example, by applying the control signals C1 to Cn to the control unit 6 according to need, and then applying the control signal CON1 from the control unit 6 to the monitoring light output unit 1 on the basis of the control signals C1 to Cn.

Thus, as with the first example embodiment, return lights with different frequencies do not need to be temporally discrete, which enables the frequent and high-speed detection of a failure in a plurality of optical transmission line pairs.

Fifth Example Embodiment

In the above-described example embodiments, the example of outputting the monitoring lights ML1 to MLn with different frequencies $f_1$ to $f_n$ to the optical transmission lines LA1 to LAn is described. In this example embodiment, an example of outputting at least two of the monitoring lights ML1 to MLn to at least one of the optical transmission lines LA1 to LAn is described.

Figure 20:
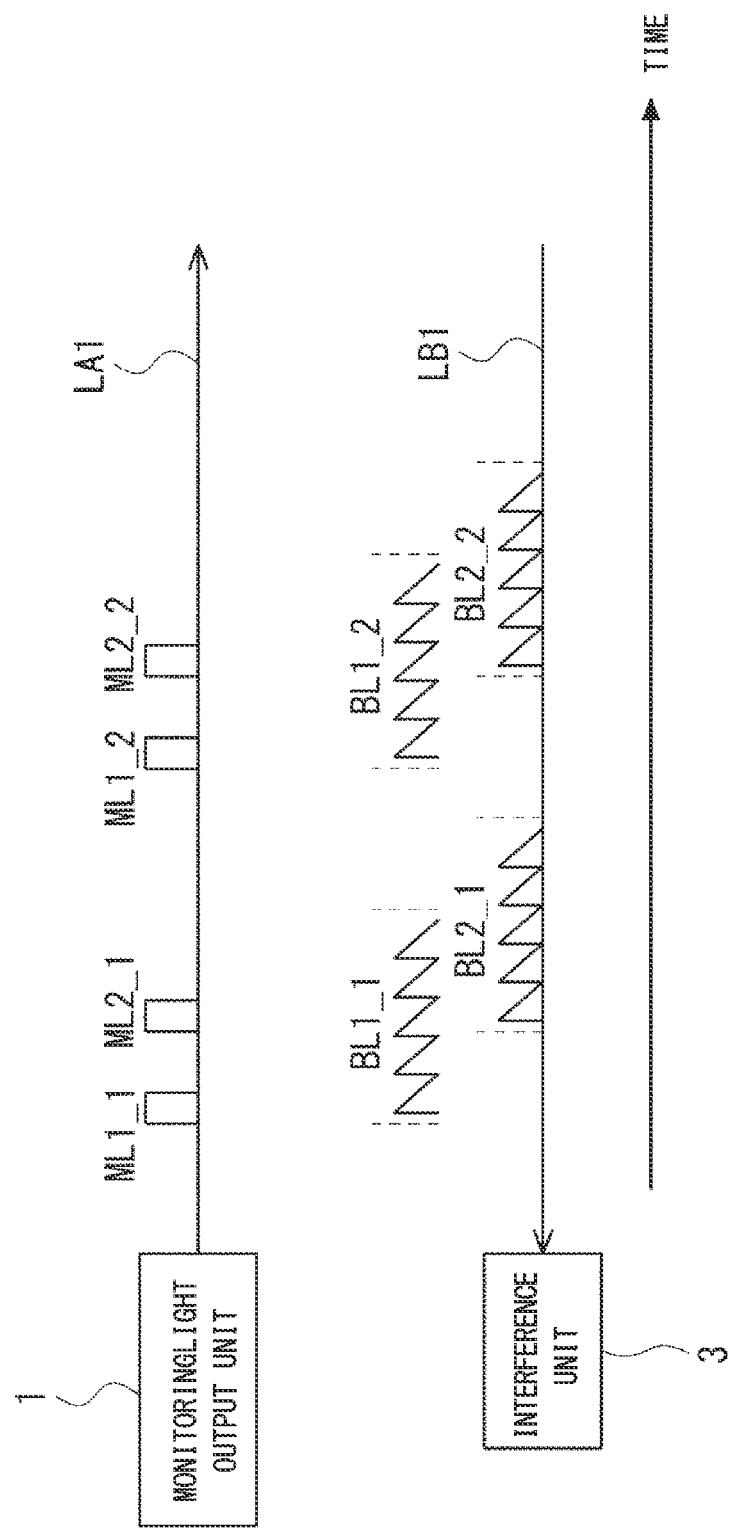
FIG. 20 is a view schematically showing propagation of monitoring lights and return lights according to a fifth example embodiment.

FIG. 20 schematically shows propagation of monitoring lights and return lights according to a fifth example embodiment. FIG. 20 shows an example where the monitoring lights ML1 and ML2 are sequentially output to the optical transmission line LA1. In this case, the return lights BL1 and BL2 corresponding to the monitoring lights ML1 and ML2 are sequentially fed back to the optical transmission line monitoring apparatus 100 through the optical transmission line LB1.

In this structure also, the output timing of each of the monitoring lights ML1 to MLn is controllable, and the optical transmission lines to which the monitoring lights ML1 to MLn are output are appropriately selectable, for example, by applying the control signals C1 to Cn to the control unit 6 according to need, and then applying the control signal CON1 from the control unit 6 to the monitoring light output unit 1 on the basis of the control signals C1 to Cn.

In this case, a failure in the optical transmission line LA1 is detectable by associating the beat frequencies $f_{LO}-f_1$ and $f_{LO}-f_2$ corresponding to the monitoring lights ML1 and ML2 with the optical transmission line LA1 in the signal processing unit 5, and detecting intensity changes of the return lights BL1 and BL2.

For example, the return lights BL1_1 and BL2_1 corresponding to the monitoring lights ML1_1 to ML2_1 temporally overlap. In this case also, the signal processing unit 5 is capable of separating the frequencies of the return lights and detecting their intensity changes in parallel.

Note that, since return lights corresponding to monitoring lights with different frequencies that are output to one optical transmission line can temporally overlap, even if the monitoring light output unit 1 simultaneously outputs the monitoring lights with different frequencies, the signal processing unit 5 is capable of separating the frequencies of the return lights and detecting their intensity changes in parallel.

Thus, as with the above-described example embodiments, return lights with different frequencies do not need to be temporally discrete, which enables the frequent and high-speed detection of a failure in a plurality of optical transmission line pairs.

In general, the intensity of a return light generated by Rayleigh scattering is low, and the signal-noise ratio (S/N ratio) of the return light that is detected by the optical transmission line monitoring apparatus 100 is relatively low. Therefore, a monitoring light may be output a plurality of times to one monitoring light, and the signal processing unit 5 may acquire and average a temporal change of the return time. The effects of the noise are thereby averaged and canceled, which improves the accuracy of failure detection. In this case, the averaging procedure is done at high speed by outputting monitoring lights with different frequencies to one optical transmission line as in this structure.

Sixth Example Embodiment

Figure 21:
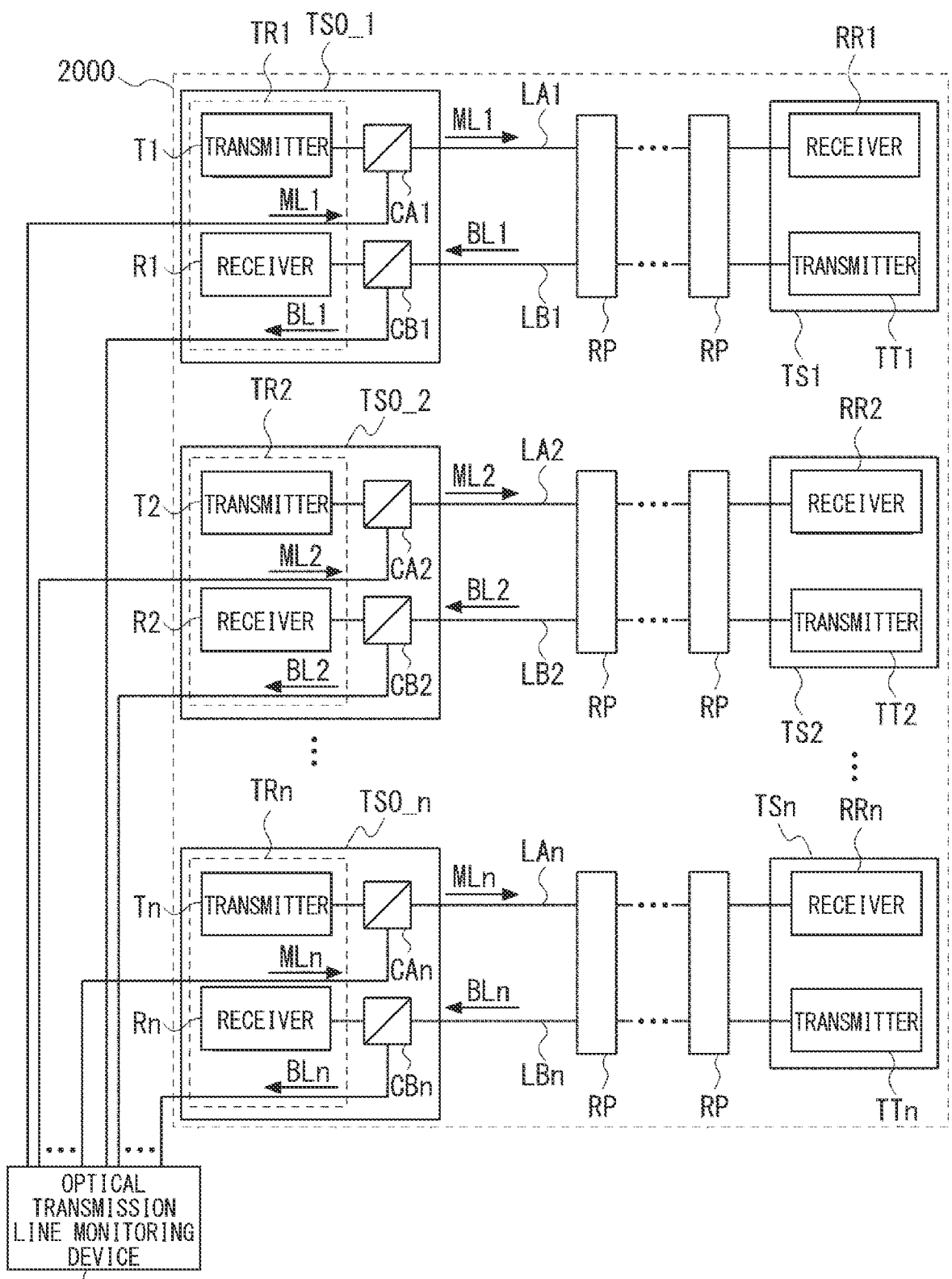
FIG. 21 is a view showing connections when monitoring an optical network by an optical transmission line monitoring apparatus according to a sixth example embodiment.

The optical transmission line monitoring apparatus according to a sixth example embodiment is described hereinafter. In the above-described example embodiments, an example where the optical transmission line monitoring apparatus 100 is connected to one terminal station TS0 is described. However, the optical transmission line monitoring apparatus 100 may be connected to a plurality of terminal stations. FIG. 21 shows connections when monitoring an optical network 2000 by the optical transmission line monitoring apparatus according to the sixth example embodiment.

The optical network 2000 is a modified example of the optical network 1000, and the light transmission apparatuses TR1 to TRn described with reference to FIG. 1 are placed in different terminal stations TS0_1 to TS0_n, respectively. The other structure of the optical network 2000 is the same as that of the optical network 1000.

As shown in FIG. 21, the number of terminal stations to which the optical transmission line monitoring apparatus 100 is connected is not limited to one, and it may be more than one. This enables the detection of a failure in optical transmission lines through which a plurality of terminal stations transmit optical signals by one optical transmission line monitoring apparatus 100. Thus, even when a plurality of terminal stations TS0_1 to TS0_n are at a distance from each other, by connecting the optical transmission line monitoring apparatus 100 and each of the terminal stations TS0_1 to TS0_n by optical transmission lines such as optical fibers, the structure of detecting a failure in optical transmission lines through which a plurality of terminal stations transmit optical signals by one optical transmission line monitoring apparatus 100 is easily implemented.

Although the structure in which the terminal stations TS0_1 to TS0_n are connected to one optical transmission line pair is described in this example embodiment, the terminal stations TS0_1 to TS0_n may be connected to two optical transmission line pairs, and the number of connections between the terminal stations TS0_1 to TS0_n and the optical transmission line monitoring apparatus 100 may be increased according to the number of optical transmission line pairs.

Seventh Example Embodiment

Figure 22:
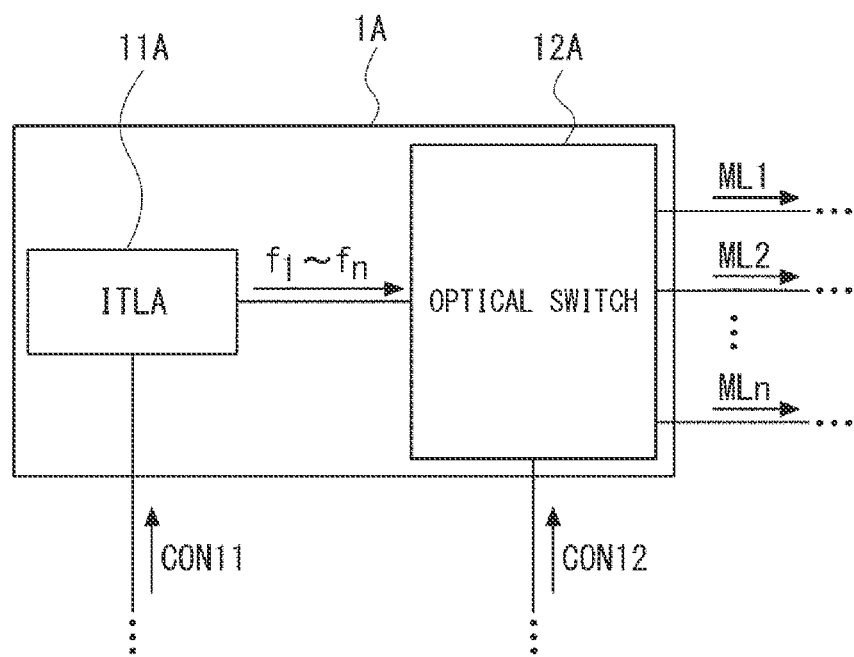
FIG. 22 is a view schematically showing the structure of a monitoring light output unit in a first modified example.

In this example embodiment, a modified example of the monitoring light generation unit of the monitoring light output unit is described. FIG. 22 schematically shows the structure of a monitoring light output unit 1A, which is a first modified example of the monitoring light output unit 1. The monitoring light output unit 1A has a structure in which the optical pulse generation unit 11 and the monitoring light generation unit 12 of the monitoring light output unit 1 are replaced with an ITLA (Integrated Tunable Laser Assembly) wavelength-tunable laser module 11A and an optical switch 12A, respectively. Note that the ITLA wavelength-tunable laser is an example of a wavelength-tunable laser, and another type of wavelength-tunable laser different from the ITLA wavelength-tunable laser may be used as a matter of course.

The ITLA wavelength-tunable laser module 11A outputs a laser light having any one of the frequencies $f_1$ to $f_n$ corresponding to the monitoring lights ML1 to MLn on the basis of the control signal CON 11 contained in the control signal CON 12. The optical switch 12A is configured as a WSS (Wavelength Selective Switch), for example, and outputs a laser light having any one of the frequencies $f_1$ to $f_n$ as the monitoring lights ML1 to MLn to the optical transmission lines LA1 to LAn on the basis of the control signal CON 12.

Stated differently, when the frequency of a laser light that is output from the ITLA wavelength-tunable laser module 11A is $f_k$, the optical switch 12A outputs the monitoring light MLk with the frequency $f_k$ to the optical transmission line LAk.

Figure 23:
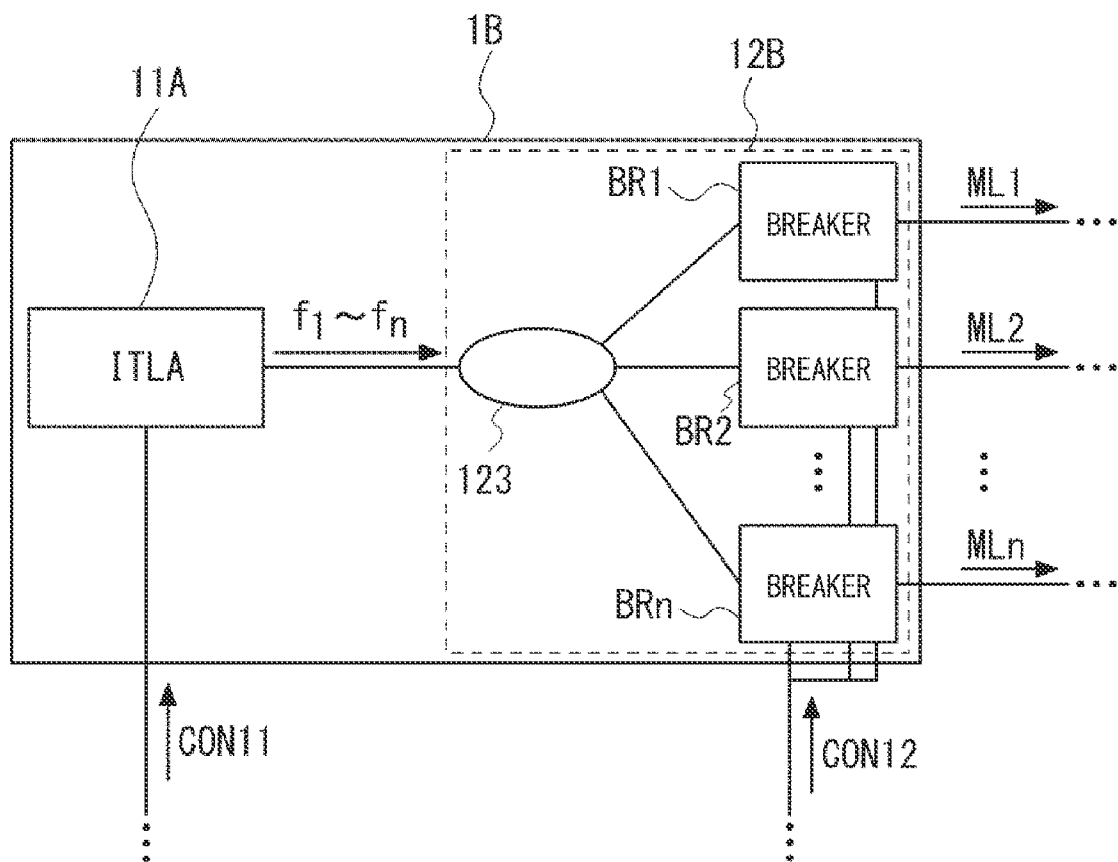
FIG. 23 is a view schematically showing the structure of a monitoring light output unit in a second modified example.

A second modified example of the monitoring light output unit is described next. FIG. 23 schematically shows the structure of a monitoring light output unit 1B, which is the second modified example of the monitoring light output unit. The monitoring light output unit 1B includes an ITLA wavelength-tunable laser module 11A, an optical coupler 123, and breakers BR1 to BRn. The ITLA wavelength-tunable laser module 11A is the same as that of the monitoring light output unit 1A, and the description thereof is omitted.

The optical coupler 123 is configured as a 1-input n-output coupler, and branches a laser light that is output from the ITLA wavelength-tunable laser module 11A to each of the breakers BR1 to BRn. The breakers BR1 to BRn output the monitoring lights ML1 to MLn with the frequencies $f_1$ to $f_n$ to the optical transmission lines LA1 to LAn, respectively, on the basis of the control signal CON 12.

Stated differently, when the frequency of a laser light that is output from the ITLA wavelength-tunable laser module 11A is $f_k$, only the breaker BRk is open, and the other breakers are closed, so that the monitoring light MLk with the frequency $f_k$ is output to the optical transmission line LAk.

Figure 24:
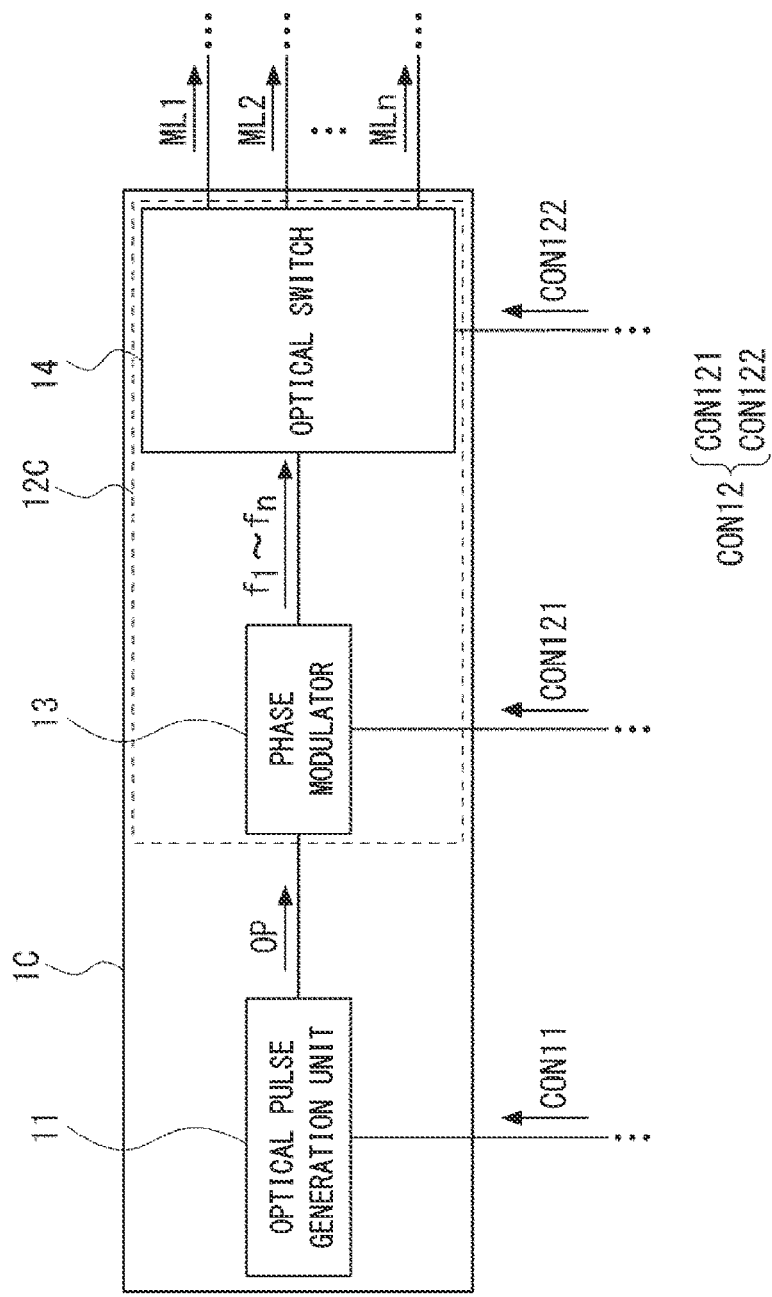
FIG. 24 is a view schematically showing the structure of a monitoring light output unit in a third modified example.

A third modified example of the monitoring light output unit is described hereinafter. FIG. 24 schematically shows the structure of a monitoring light output unit 1C, which is the third modified example of the monitoring light output unit. The monitoring light output unit 1C has a structure in which the monitoring light generation unit 12 of the monitoring light output unit 1 is replaced with a monitoring light generation unit 12C. The monitoring light generation unit 12C includes a phase modulator 13 and an optical switch 14. The optical switch 14 is the same as the optical switch 12A, and the description thereof is omitted.

The phase modulator 13 is capable of modulating the phase of the optical pulse OP that is output from the optical pulse generation unit 11, and controls the frequency of the optical pulse OP on the basis of a control signal CON 121 contained in the control signal CON 12. The optical switch 14 outputs an optical pulse having any one of the frequencies $f_1$ to $f_n$ as the monitoring lights ML1 to MLn to the optical transmission lines LA1 to LAn on the basis of a control signal CON 122 contained in the control signal CON 12.

Stated differently, when the frequency of a laser light that is output from the phase modulator 13 is $f_k$, the optical switch 14 outputs the monitoring light MLk with the frequency $f_k$ to the optical transmission line LAk.

As described above, the use of the monitoring light output unit shown in FIGS. 22 to 24 also enables providing the optical transmission line monitoring apparatus capable of detecting a failure in optical transmission lines, just like the optical transmission line monitoring apparatus according to the above-described example embodiments.

Eighth Example Embodiment

Figure 25:
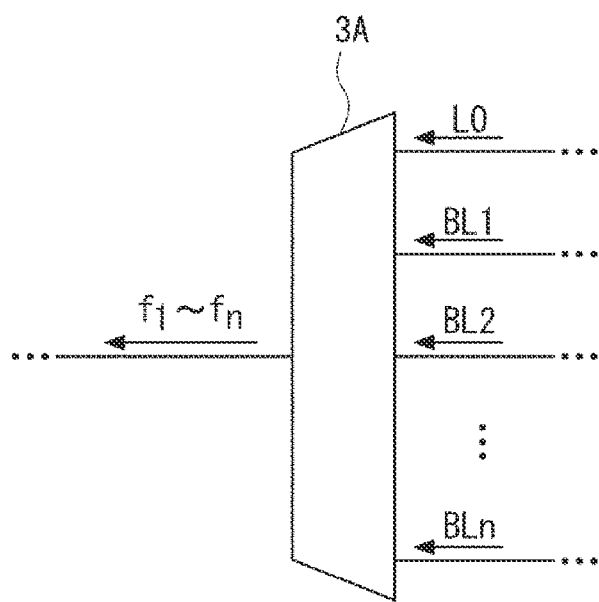
FIG. 25 is a view schematically showing the structure of an interference unit in a modified example.

In this example embodiment, a modified example of the interference unit is described. FIG. 25 schematically shows the structure of an interference unit 3A, which is a modified example of the interference unit. The interference unit 3A is configured as an optical wavelength multiplexer. The interference unit 3A is configured as (n+1)-input 1-output optical wavelength multiplexer. The return lights BL1 to BLn are input to the interference unit 3A through the optical transmission lines LB1 to LBn, and the local oscillation light LO is also input to the interference unit 3A. Even when the return lights BL1 to BLn temporally overlap, some or all of the return lights BL1 to BLn are multiplexed with the local oscillation light LO and thereby they interfere with each other.

Thus, as with the interference unit 3, the interference unit 3A is capable of outputting an output light that is generated by the interference of the return lights BL1 to BLn input through the different optical transmission lines LB1 to LBn with the local oscillation light to the conversion unit 4 through the same path.

Ninth Example Embodiment

Figure 26:
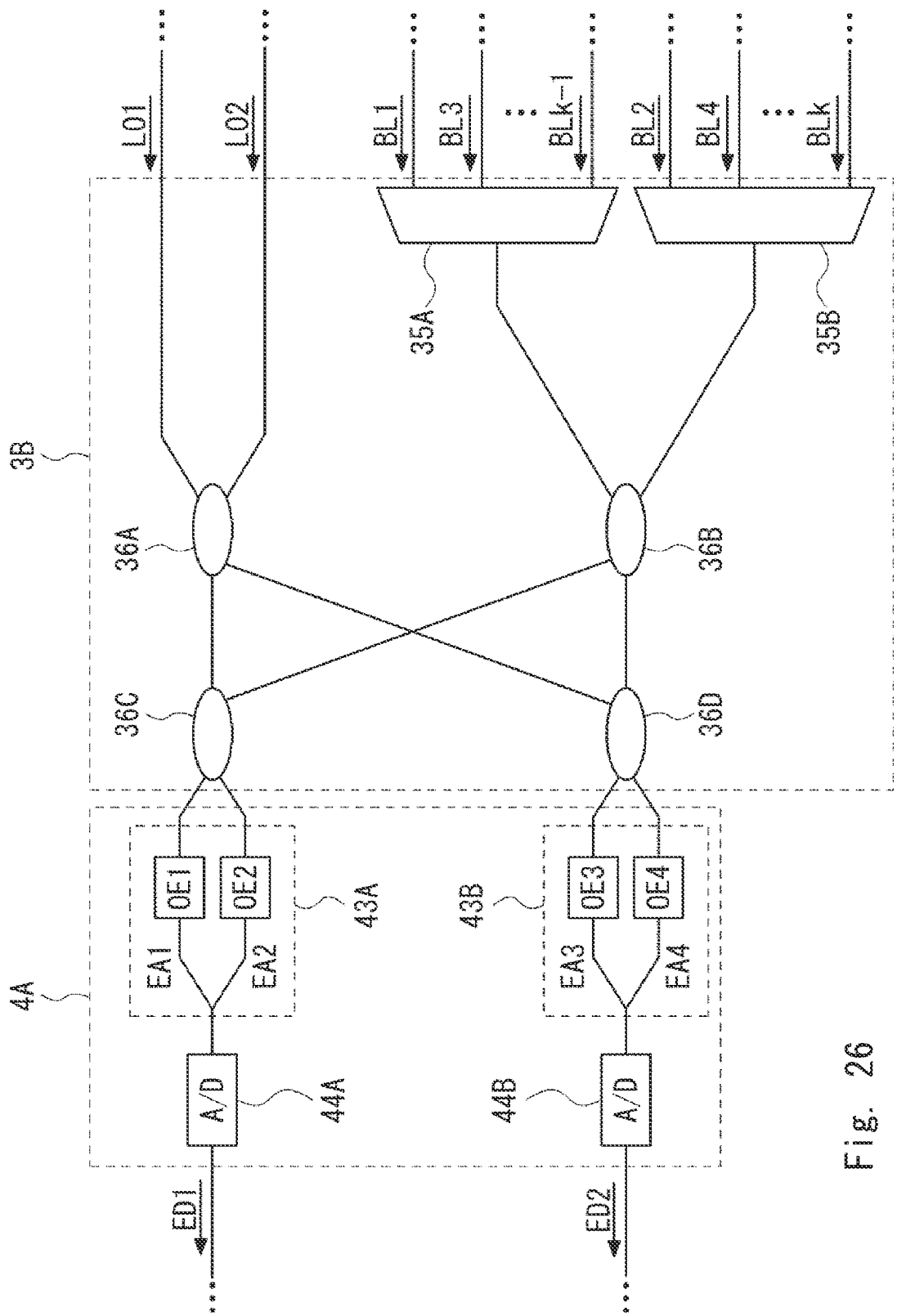
FIG. 26 is a view schematically showing the structure of an interference unit and a conversion unit in a modified example.

In this example embodiment, a modified example of the interference unit and the conversion unit is described. FIG. 26 schematically shows the structure of an interference unit 3B and a conversion unit 4A, which are a modified example of the interference unit and the conversion unit. The interference unit 3A includes optical wavelength multiplexers 35A and 35B and optical intensity multiplexers 36A to 36D. In the following description, it is assumed that the number of the monitoring lights ML1 to MLn is an even number (i.e., k=2m where m is an integer of or more).

The optical wavelength multiplexers 35A and 35B are configured as k/2-input 1-output optical wavelength multiplexers. Return lights BL1, BL3, . . . , BLk−1 with wavelengths $f_1, f_3, \ldots, f_{k-1}$ are input to the optical wavelength multiplexer 35A, and their monitoring lights are multiplexed and output to the optical intensity multiplexer 36B. Return lights BL2, BL4, . . . , BLk with wavelengths $f_2, f_4, \ldots, f_k$ are input to the optical wavelength multiplexer 35B, and their monitoring lights are multiplexed and output to the optical intensity multiplexer 36B.

The optical intensity multiplexers 36A to 36D are configured as 2-input 2-output optical intensity multiplexers. One input of the optical intensity multiplexer 36A is connected to the local oscillation light source 2, and a local oscillation light LO1 with a frequency $f_{LO1}$ is input thereto, and the other input of the optical intensity multiplexer 36A is connected to the local oscillation light source 2, and a local oscillation light LO2 with a frequency $f_{LO2}$ is input thereto. Note that the local oscillation light LO1 and the local oscillation light LO2 may be output from the same local oscillation light source or may be output from different local oscillation light sources.

One output of the optical intensity multiplexer 36A is connected to one input of the optical intensity multiplexer 36C, and the other output is connected to one input of the optical intensity multiplexer 36D.

One input of the optical intensity multiplexer 36B is connected to the output of the optical wavelength multiplexer 35A, and the other input is connected to the output of the optical wavelength multiplexer 35B. One output of the optical intensity multiplexer 36B is connected to the other input of the optical intensity multiplexer 36C, and the other output is connected to the other input of the optical intensity multiplexer 36D. The return lights BL1 to BLk thereby interfere with each of the local oscillation lights LO1 and LO2, and output lights are output from the interference unit 3B.

The conversion unit 4A is described next. The conversion unit 4A includes balanced receivers 43A and 43B, and A/D conversion units 44A and 44B.

The balanced receiver 43A includes two photoelectronic conversion units OE1 and OE2. The input of the photoelectronic conversion unit OE1 is connected to one input of the optical intensity multiplexer 36C, and it converts a light input from the optical intensity multiplexer 36C into an analog electrical signal EA1, and outputs it to the A/D conversion unit 44A. The input of the photoelectronic conversion unit OE2 is connected to the other input of the optical intensity multiplexer 36C, and it converts a light input from the optical intensity multiplexer 36C into an analog electrical signal EA2, and outputs it to the A/D conversion unit 44A.

The balanced receiver 43B includes two photoelectronic conversion units OE3 and OE4. The input of the photoelectronic conversion unit OE3 is connected to one input of the optical intensity multiplexer 36D, and it converts a light input from the optical intensity multiplexer 36D into an analog electrical signal EA3, and outputs it to the A/D conversion unit 44B. The input of the photoelectronic conversion unit OE4 is connected to the other input of the optical intensity multiplexer 36D, and it converts a light input from the optical intensity multiplexer 36C into an analog electrical signal EA4, and outputs it to the A/D conversion unit 44B.

The A/D conversion unit 44A converts a signal that combines the analog electrical signals EA1 and EA2 into a digital electrical signal ED1, and outputs it to the signal processing unit 5. The A/D conversion unit 44B converts a signal that combines the analog electrical signals EA3 and EA4 into a digital electrical signal ED2, and outputs it to the signal processing unit 5.

In this structure, two local oscillation lights with different frequencies interfere with return lights, and the beat frequency contained in the digital electrical signal converted by the A/D conversion unit is thereby doubled, and therefore the dynamic range of the acquired beat frequency is doubled compared with the case of using only one local oscillation light. Note that, however, the frequency $f_{LO1}$ of the local oscillation light LO1 and the frequency $f_{LO2}$ of the local oscillation light LO2 are not necessarily different, and they may be the same.

Further, by using the optical intensity multiplexers and the balanced receivers, all of wavelength-demultiplexed signals are photoelectrically converted. This allows using all of the wavelength-demultiplexed signals without wasting them, which cancels loss due to demultiplexing splitting and achieves highly efficient signal processing.

Further, since two optical wavelength multiplexers that multiplex the wavelengths of return lights are provided, the wavelength interval of each optical wavelength multiplexer is greater than the case with only one optical wavelength multiplexer.

Other Example Embodiments

The present invention is not limited to the above-described example embodiments and can be modified as appropriate without departing from the spirit and scope of the present invention. For example, in the above-described example embodiments, each terminal station may be installed on land, and the light transmission apparatus may be installed not only on land but also installed in offshore or undersea facilities.

Although each system includes a pair of two optical transmission lines in the above-described example embodiments, a monitoring light may be output to one optical transmission line, and a return light may be fed back through the same optical transmission line.

Although the optical transmission line monitoring apparatus monitors optical transmission lines of a submarine optical network system in the above-described example embodiments, this is merely an example. The optical transmission line monitoring apparatus may monitor any optical network system other than a submarine optical network system, such as a land-based optical network system. Further, it may be applied to other uses, such as sensing, not limited to monitoring of an optical network.

For example, the whole or part of the example embodiments disclosed above can be described as, but not limited to, the following supplementary notes.

(Supplementary Note 1)

An optical transmission line monitoring apparatus including:

a monitoring light output unit configured to output a plurality of monitoring lights with different frequencies to a plurality of first optical transmission lines, respectively;

a local oscillation light source configured to output a local oscillation light;

an interference unit, to which a plurality of return lights corresponding to the plurality of monitoring lights are input, configured to output an output light generated by interference between input lights and the local oscillation light;

a conversion unit configured to convert the output light into an electrical signal; and a signal processing unit configured to extract, from the electrical signal, a signal having beat frequencies respectively based on the plurality of monitoring lights, and generate a monitoring result of each of the first optical transmission lines from the signal having the beat frequencies.

(Supplementary Note 2)

The optical transmission line monitoring apparatus according to Supplementary Note 1, in which each of the return lights is input to the interference unit through a second optical transmission line paired with each of the first optical transmission lines.

(Supplementary Note 3)

The optical transmission line monitoring apparatus according to Supplementary Note 2, in which at least one optical repeater is inserted in the first and second optical transmission lines, and the return light generated by scattering of the monitoring light having passed through one of the optical repeaters is branched from the first optical transmission line and coupled to the second optical transmission line by the one optical repeater.

(Supplementary Note 4)

The optical transmission line monitoring apparatus according to any one of Supplementary Notes 1 to 3, further including a control unit configured to control timing to output each of the plurality of monitoring lights from the monitoring light output unit.

(Supplementary Note 5)

The optical transmission line monitoring apparatus according to Supplementary Note 4, in which the control unit determines timing to output the monitoring lights on the basis of a length of the first optical transmission line and a propagation speed of each monitoring light through the first optical transmission line.

(Supplementary Note 6)

The optical transmission line monitoring apparatus according to Supplementary Note 4 or 5, in which the control unit controls a frequency of each monitoring light on the basis of a given command.

(Supplementary Note 7)

The optical transmission line monitoring apparatus according to any one of Supplementary Notes 1 to 6, in which the signal processing unit includes:

a plurality of filters configured to extract, from the electrical signal, a signal having a plurality of beat frequencies based on the plurality of monitoring lights; and a plurality of processing units configured to generate monitoring results of the plurality of first optical transmission lines from the signal having the plurality of beat frequencies.

(Supplementary Note 8)

The optical transmission line monitoring apparatus according to any one of Supplementary Notes 1 to 5, further including:

a control unit configured to control a frequency of each of the monitoring lights on the basis of a given command, and notify the signal processing unit of the frequency of each of the monitoring lights, in which the signal processing unit includes:

a plurality of filters configured to extract, from the electrical signal, a signal having a plurality of beat frequencies based on the plurality of monitoring lights; and a plurality of processing units configured to generate monitoring results of the plurality of first optical transmission lines from the signal having the plurality of beat frequencies, and a frequency of the signal extracted by each filter is adjusted on the basis of the notified frequency of the monitoring light.

(Supplementary Note 9)

An optical transmission line monitoring system including:

an optical transmission apparatus configured to output an optical signal to a plurality of first optical transmission lines; and an optical transmission line monitoring apparatus connected to the optical transmission apparatus and configured to monitor the plurality of first optical transmission lines, in which the optical transmission line monitoring apparatus includes:

a monitoring light output unit configured to output a plurality of monitoring lights with different frequencies to a plurality of first optical transmission lines, respectively;

a local oscillation light source configured to output a local oscillation light;

an interference unit, to which a plurality of return lights corresponding to the plurality of monitoring lights are input, configured to output an output light generated by interference between input lights and the local oscillation light;

a conversion unit configured to convert the output light into an electrical signal; and a signal processing unit configured to extract, from the electrical signal, a signal having beat frequencies respectively based on the plurality of monitoring lights, and generate a monitoring result of each of the first optical transmission lines from the signal having the beat frequencies.

(Supplementary Note 10)

The optical transmission line monitoring system according to Supplementary Note 9, in which each of the return lights is input to the interference unit through a second optical transmission line paired with each of the first optical transmission lines.

(Supplementary Note 11)

The optical transmission line monitoring system according to Supplementary Note 10, in which at least one optical repeater is inserted in the first and second optical transmission lines, and the return light generated by scattering of the monitoring light having passed through one of the optical repeaters is branched from the first optical transmission line and coupled to the second optical transmission line by the one optical repeater.

(Supplementary Note 12)

The optical transmission line monitoring system according to any one of Supplementary Notes 9 to 11, further including a control unit configured to control timing to output each of the plurality of monitoring lights from the monitoring light output unit.

(Supplementary Note 13)

The optical transmission line monitoring system according to Supplementary Note 12, in which the control unit determines timing to output the monitoring lights on the basis of a length of the first optical transmission line and a propagation speed of each monitoring light through the first optical transmission line.

(Supplementary Note 14)

The optical transmission line monitoring system according to Supplementary Note 12 or 13, in which the control unit controls a frequency of each monitoring light on the basis of a given command.

(Supplementary Note 15)

The optical transmission line monitoring system according to any one of Supplementary Notes 9 to 14, in which the signal processing unit includes:

a plurality of filters configured to extract, from the electrical signal, a signal having a plurality of beat frequencies based on the plurality of monitoring lights; and a plurality of processing units configured to generate monitoring results of the plurality of first optical transmission lines from the signal having the plurality of beat frequencies.

(Supplementary Note 16)

The optical transmission line monitoring system according to any one of Supplementary Notes 9 to 13, further including:

a control unit configured to control a frequency of each of the monitoring lights on the basis of a given command, and notify the signal processing unit of the frequency of each of the monitoring lights, in which the signal processing unit includes:

a plurality of filters configured to extract, from the electrical signal, a signal having a plurality of beat frequencies based on the plurality of monitoring lights; and a plurality of processing units configured to generate monitoring results of the plurality of first optical transmission lines from the signal having the plurality of beat frequencies, and a frequency of the signal extracted by each filter is adjusted on the basis of the notified frequency of the monitoring light.

(Supplementary Note 17)

An optical transmission line monitoring method including:

outputting a plurality of monitoring lights with different frequencies to a plurality of first optical transmission lines, respectively;

outputting an output light generated by interference between a plurality of return lights corresponding to the plurality of monitoring lights and a local oscillation light;

converting the output light into an electrical signal; and extracting, from the electrical signal, a signal having beat frequencies respectively based on the plurality of monitoring lights, and generating a monitoring result of each of the first optical transmission lines from the signal having the beat frequencies.

(Supplementary Note 18)

The optical transmission line monitoring method according to Supplementary Note 17, in which the output light is output by the interference between the local oscillation light and the plurality of return lights corresponding to the plurality of monitoring lights from second optical transmission lines paired with the first optical transmission lines.

(Supplementary Note 19)

The optical transmission line monitoring method according to Supplementary Note 18, in which at least one optical repeater is inserted in the first and second optical transmission lines, and the return light generated by scattering of the monitoring light having passed through one of the optical repeaters is branched from the first optical transmission line and coupled to the second optical transmission line by the one optical repeater.

(Supplementary Note 20)

The optical transmission line monitoring method according to any one of Supplementary Notes 17 to 19, in which timing to output the monitoring lights is determined on the basis of a length of the first optical transmission line and a propagation speed of each monitoring light through the first optical transmission line.

(Supplementary Note 21)

The optical transmission line monitoring method according to any one of Supplementary Notes 17 to 20, in which a frequency of each monitoring light is controlled on the basis of a given command.

(Supplementary Note 22)

The optical transmission line monitoring method according to any one of Supplementary Notes 17 to 20, including:

determining a frequency of each of the monitoring lights on the basis of a given command;

extracting, from the electrical signal, a signal having a plurality of beat frequencies based on the plurality of monitoring lights; and generating monitoring results of the plurality of first optical transmission lines from the signal having the plurality of beat frequencies, in which a frequency of a signal to be extracted is determined on the basis of the determined frequency of the monitoring light.

While the present invention has been particularly shown and described with reference to example embodiments thereof, the present invention is not limited to these example embodiments. It will be understood by those of ordinary skill in the art that various changes in form and details may be made therein without departing from the spirit and scope of the present invention.

This application is based upon and claims the benefit of priority from Japanese patent application No. 2018-215319 filed on Nov. 16, 2018, the disclosure of which is incorporated herein in its entirety by reference.

REFERENCE SIGNS LIST

100 OPTICAL TRANSMISSION LINE MONITORING APPARATUS
1, 1A, 1B, 1C MONITORING LIGHT OUTPUT UNITS
2 LOCAL OSCILLATION LIGHT SOURCE
3, 3A, 3B INTERFERENCE UNIT
4 CONVERSION UNIT
4A CONVERSION UNITS
5 SIGNAL PROCESSING UNIT
6 CONTROL UNIT

11 OPTICAL PULSE GENERATION UNIT
11A ITLA WAVELENGTH-tunable LASER MODULE
12 MONITORING LIGHT GENERATION UNIT
12A, 14 OPTICAL SWITCHES
13 PHASE MODULATOR
31~34 COUPLERS
35A, 35B OPTICAL WAVELENGTH MULTIPLEXERS
36A~36D OPTICAL INTENSITY MULTIPLEXERS
41 PHOTOELECTRONIC CONVERSION UNIT
42, 44A, 44B A/D CONVERSION UNITS
43A, 43B BALANCED RECEIVERS
123 OPTICAL COUPLER
1000, 2000 OPTICAL NETWORKS
A1, A2 OPTICAL AMPLIFIERS
BL1~BLn RETURN LIGHTS
BR1~BRn BREAKERS
CP1~CP4, CA1~CAn, CB1~CBn COUPLERS
C1~Cn CONTROL SIGNALS
CON1, CON2, CON11, CON12, CON121, CON122 CONTROL SIGNALS
D1~Dn DATA SIGNALS
EA, EA1~EA4 ANALOG ELECTRICAL SIGNALS
ED, ED1, ED2 DIGITAL ELECTRICAL SIGNALS
F1~Fn FILTERS
LA1~LAn, LB1~LBn OPTICAL TRANSMISSION LINES
LO, LO1, LO2 LOCAL OSCILLATION LIGHTS
ML1~MLn MONITORING LIGHTS
OE1~OE4 PHOTOELECTRONIC CONVERSION UNITS
P1~Pn DATA PROCESSING UNITS
R1~Rn, RR1~RRn RECEIVERS
RP, RP1~RPn OPTICAL REPEATERS
S1~Sn SYSTEMS
T1~Tn, TT1~TTn TRANSMITTERS
TR0~TRn LIGHT TRANSMISSION APPARATUSES
TS0~TSn TERMINAL STATIONS

The invention claimed is:

1. An optical transmission line monitoring apparatus comprising:
a monitoring light output unit configured to output a plurality of monitoring lights with different frequencies to a plurality of first optical transmission lines, respectively;
a local oscillation light source configured to output a local oscillation light;
an interference unit, to which a plurality of return lights corresponding to the plurality of monitoring lights are input, configured to output an output light generated by interference between input lights and the local oscillation light;
a conversion unit configured to convert the output light into an electrical signal;
a signal processing unit configured to extract, from the electrical signal, a signal having beat frequencies respectively based on the plurality of monitoring lights, and generate a monitoring result of each of the first optical transmission lines from the signal having the beat frequencies; and
a control unit configured to control a frequency of each of the plurality of the monitoring lights on the basis of a given command.

2. The optical transmission line monitoring apparatus according to claim 1, wherein each of the return lights is input to the interference unit through a second optical transmission line paired with each of the first optical transmission lines.

3. The optical transmission line monitoring apparatus according to claim 2, wherein at least one optical repeater is inserted in the first and second optical transmission lines, and
the return light generated by scattering of the monitoring light having passed through one of the optical repeaters is branched from the first optical transmission line and coupled to the second optical transmission line by the one optical repeater.

4. The optical transmission line monitoring apparatus according to claim 1, wherein the control unit controls timing to output each of the plurality of monitoring lights from the monitoring light output unit.

5. The optical transmission line monitoring apparatus according to claim 4, wherein the control unit determines timing to output the monitoring lights on the basis of a length of the first optical transmission line and a propagation speed of each monitoring light through the first optical transmission line.

6. The optical transmission line monitoring apparatus according to claim 1, wherein the signal processing unit comprises:
a plurality of filters configured to extract, from the electrical signal, a signal having a plurality of beat frequencies based on the plurality of monitoring lights; and
a plurality of processing units configured to generate monitoring results of the plurality of first optical transmission lines from the signal having the plurality of beat frequencies.

7. The optical transmission line monitoring apparatus according to claim 1, wherein the control unit notifies the signal processing unit of the frequency of each of the monitoring lights, and
the signal processing unit comprises:
a plurality of filters configured to extract, from the electrical signal, a signal having a plurality of beat frequencies based on the plurality of monitoring lights; and
a plurality of processing units configured to generate monitoring results of the plurality of first optical transmission lines from the signal having the plurality of beat frequencies, and
a frequency of the signal extracted by each filter is adjusted on the basis of the notified frequency of the monitoring light.

8. The optical transmission line monitoring apparatus according to claim 1, wherein the command instructs to detect a failure of the first optical transmission lines.

9. An optical transmission line monitoring system comprising:
an optical transmission apparatus configured to output an optical signal to a plurality of first optical transmission lines; and
an optical transmission line monitoring apparatus connected to the optical transmission apparatus and configured to monitor the plurality of first optical transmission lines, wherein
the optical transmission line monitoring apparatus comprises:
a monitoring light output unit configured to output a plurality of monitoring lights with different frequencies to a plurality of first optical transmission lines, respectively;
a local oscillation light source configured to output a local oscillation light;
an interference unit, to which a plurality of return lights corresponding to the plurality of monitoring lights are input, configured to output an output light generated by interference between input lights and the local oscillation light;

a conversion unit configured to convert the output light into an electrical signal;

a signal processing unit configured to extract, from the electrical signal, a signal having beat frequencies respectively based on the plurality of monitoring lights, and generate a monitoring result of each of the first optical transmission lines from the signal having the beat frequencies; and a control unit configured to control a frequency of each of the plurality of the monitoring lights on the basis of a given command.

10. The optical transmission line monitoring system according to claim 9, wherein each of the return lights is input to the interference unit through a second optical transmission line paired with each of the first optical transmission lines.

11. The optical transmission line monitoring system according to claim 10, wherein
at least one optical repeater is inserted in the first and second optical transmission lines, and
the return light generated by scattering of the monitoring light having passed through one of the optical repeaters is branched from the first optical transmission line and coupled to the second optical transmission line by the one optical repeater.

12. The optical transmission line monitoring system according to claim 9, wherein the control unit controls timing to output each of the plurality of monitoring lights from the monitoring light output unit.

13. The optical transmission line monitoring system according to claim 12, wherein the control unit determines timing to output the monitoring lights on the basis of a length of the first optical transmission line and a propagation speed of each monitoring light through the first optical transmission line.

14. The optical transmission line monitoring system according to claim 9, wherein the signal processing unit comprises:
a plurality of filters configured to extract, from the electrical signal, a signal having a plurality of beat frequencies based on the plurality of monitoring lights; and
a plurality of processing units configured to generate monitoring results of the plurality of first optical transmission lines from the signal having the plurality of beat frequencies.

15. The optical transmission line monitoring system according to claim 9, wherein the control unit notifies the signal processing unit of the frequency of each of the monitoring lights, and the signal processing unit comprises:
a plurality of filters configured to extract, from the electrical signal, a signal having a plurality of beat frequencies based on the plurality of monitoring lights; and
a plurality of processing units configured to generate monitoring results of the plurality of first optical transmission lines from the signal having the plurality of beat frequencies, and
a frequency of the signal extracted by each filter is adjusted on the basis of the notified frequency of the monitoring light.

16. The optical transmission line monitoring system according to claim 9, wherein the command instructs to detect a failure of the first optical transmission lines.

17. An optical transmission line monitoring method comprising:
outputting a plurality of monitoring lights with different frequencies to a plurality of first optical transmission lines, respectively;
outputting an output light generated by interference between a plurality of return lights corresponding to the plurality of monitoring lights and a local oscillation light;
converting the output light into an electrical signal;
extracting, from the electrical signal, a signal having beat frequencies respectively based on the plurality of monitoring lights, and generating a monitoring result of each of the first optical transmission lines from the signal having the beat frequencies; and
controlling a frequency of each of the plurality of the monitoring lights on the basis of a given command.

18. The optical transmission line monitoring method according to claim 17, wherein the output light is output by the interference between the local oscillation light and the plurality of return lights corresponding to the plurality of monitoring lights from second optical transmission lines paired with the first optical transmission lines.

19. The optical transmission line monitoring method according to claim 18, wherein
at least one optical repeater is inserted in the first and second optical transmission lines, and
the return light generated by scattering of the monitoring light having passed through one of the optical repeaters is branched from the first optical transmission line and coupled to the second optical transmission line by the one optical repeater.

20. The optical transmission line monitoring method according to claim 17, wherein timing to output the monitoring lights is determined on the basis of a length of the first optical transmission line and a propagation speed of each monitoring light through the first optical transmission line.

* * * * *